(12) United States Patent
Lozier et al.

(10) Patent No.: US 11,027,530 B2
(45) Date of Patent: Jun. 8, 2021

(54) RECREATIONAL VEHICLE COMPONENT WITH IMAGE AND METHOD OF MANUFACTURING

(71) Applicant: Jayco, Inc., Middlebury, IN (US)

(72) Inventors: Todd B. Lozier, Elkhart, IN (US); Steven J. Romanowski, Albion, IN (US)

(73) Assignee: Jayco, Inc., Middlebury, IN (US)

( * ) Notice: Subject to any disclaimer, the term of this patent is extended or adjusted under 35 U.S.C. 154(b) by 0 days.

(21) Appl. No.: 16/356,716

(22) Filed: Mar. 18, 2019

(65) Prior Publication Data

US 2020/0298537 A1  Sep. 24, 2020

(51) Int. Cl.
| | | |
|---|---|---|
| *B32B 3/00* | (2006.01) | |
| *B32B 21/10* | (2006.01) | |
| *B60R 13/00* | (2006.01) | |
| *B62D 65/00* | (2006.01) | |
| *B32B 38/00* | (2006.01) | |
| *B32B 37/18* | (2006.01) | |
| *B62D 21/18* | (2006.01) | |

(52) U.S. Cl.
CPC ............ *B32B 21/10* (2013.01); *B32B 37/182* (2013.01); *B32B 38/145* (2013.01); *B60R 13/005* (2013.01); *B62D 21/18* (2013.01); *B62D 65/00* (2013.01); *B32B 2255/02* (2013.01); *B32B 2605/00* (2013.01)

(58) Field of Classification Search
CPC ..... B32B 21/10; B32B 37/182; B32B 38/145; B60R 13/00; B62D 65/00
See application file for complete search history.

(56) References Cited

U.S. PATENT DOCUMENTS

| | | |
|---|---|---|
| 8,887,474 B1 | 11/2014 | Clark et al. |
| 2005/0175794 A1 | 8/2005 | Dathe |
| 2007/0007794 A1 | 1/2007 | Bertoch et al. |

(Continued)

FOREIGN PATENT DOCUMENTS

KR  2014-0036704 A  3/2014

OTHER PUBLICATIONS

PCT Written Opinion of the International Searching Authority regarding PCT/US2020/022955, dated Jul. 16, 2020.

(Continued)

*Primary Examiner* — Elizabeth E Mulvaney
(74) *Attorney, Agent, or Firm* — Warner Norcross + Judd LLP

(57) ABSTRACT

A structural panel for a recreational vehicle includes a plurality of layers laminated together to form a lamination. The lamination forms an outer surface of the structural panel, which is configured to form a sidewall, a ceiling, or a floor of the recreational vehicle when mounted in the recreational vehicle relative to the vehicle chassis. The structural panel further includes an image that is formed on or in one of the plurality of layers in or internal to the structural panel and which is visible at the outer surface. The image is in a location that is in a known fixed registry with a structural reference, such as the outer perimeter, of the structural panel prior to the panel being mounted in the recreational vehicle wherein the location of the image is known relative to the structural reference of the structural panel.

12 Claims, 22 Drawing Sheets

(56) References Cited

U.S. PATENT DOCUMENTS

| | | | |
|---|---|---|---|
| 2007/0011959 A1* | 1/2007 | DeBene | E04G 21/1891 |
| | | | 52/105 |
| 2008/0052941 A1* | 3/2008 | Nyberg | E04F 21/00 |
| | | | 33/566 |
| 2009/0277031 A1* | 11/2009 | Stocking | E04G 21/1841 |
| | | | 33/562 |
| 2012/0019024 A1 | 1/2012 | Zhao et al. | |
| 2013/0011633 A1* | 1/2013 | Perry | B44C 5/0461 |
| | | | 428/195.1 |
| 2013/0327465 A1* | 12/2013 | Borusheski | E04F 21/1844 |
| | | | 156/71 |
| 2016/0002848 A1 | 1/2016 | Roberts | |
| 2018/0319309 A1 | 11/2018 | Dame et al. | |

OTHER PUBLICATIONS

PCT International Search Report regarding PCT/US2020/022955, dated Jul. 16, 2020.

\* cited by examiner

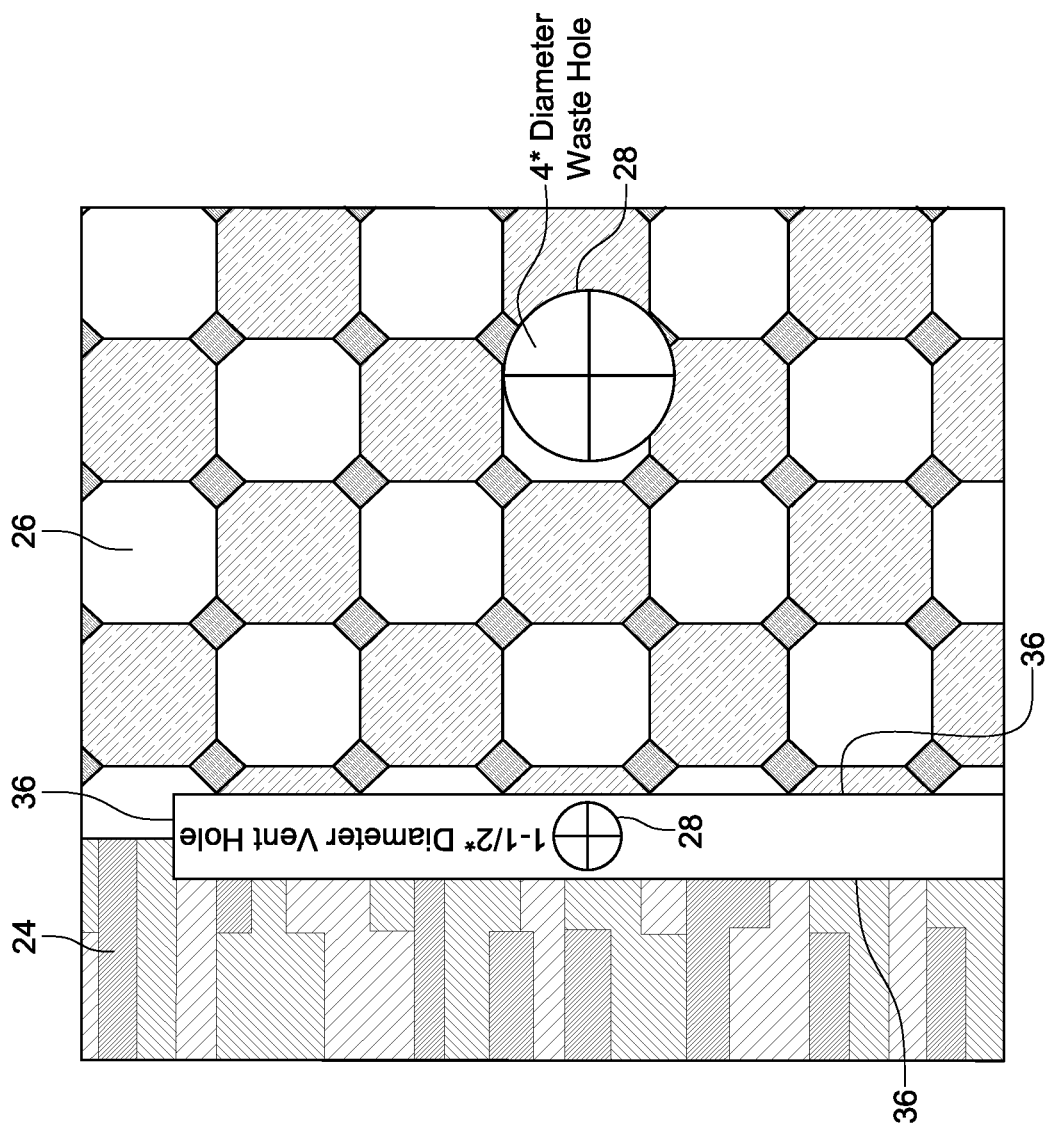

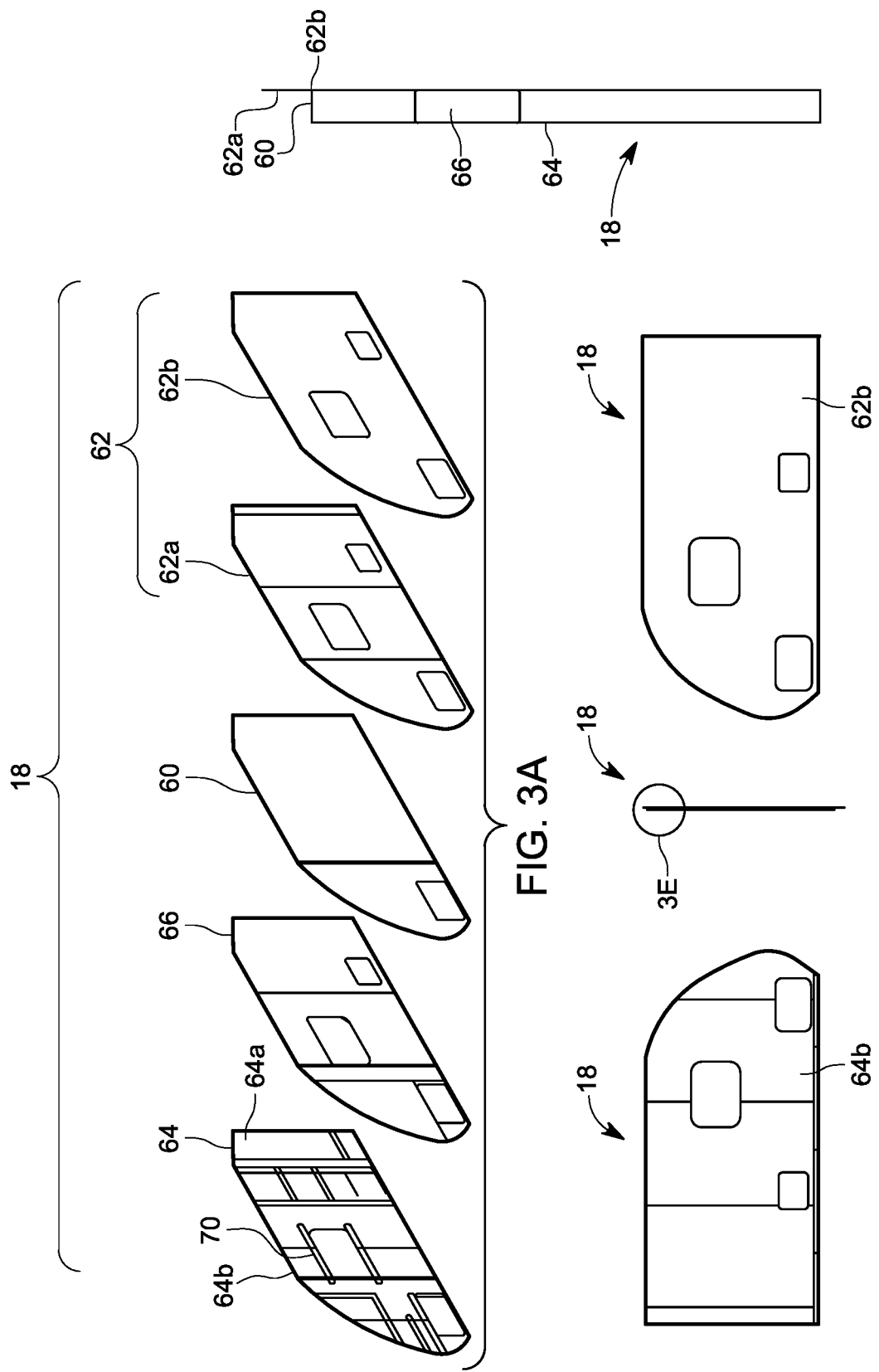

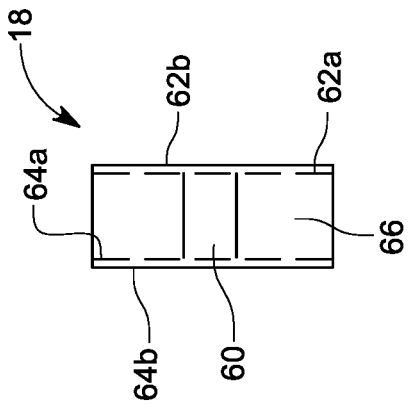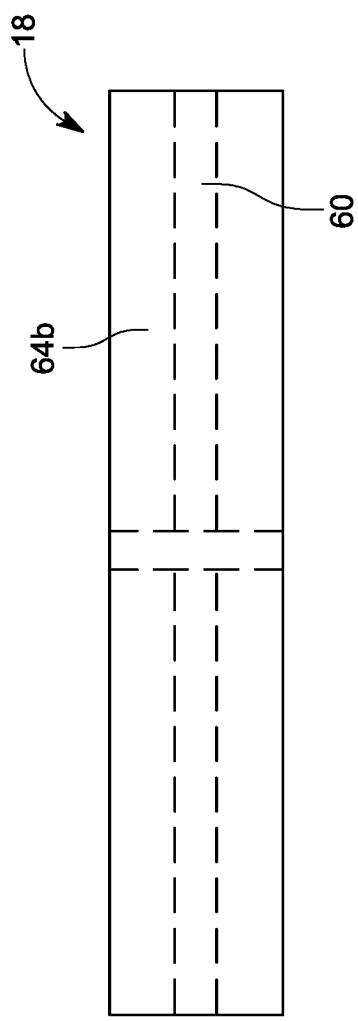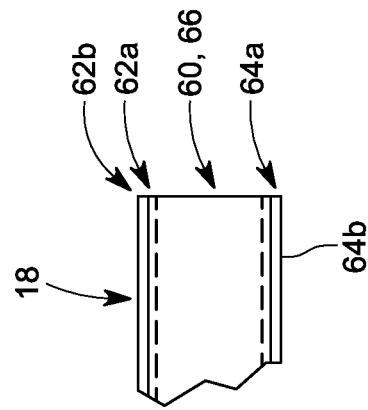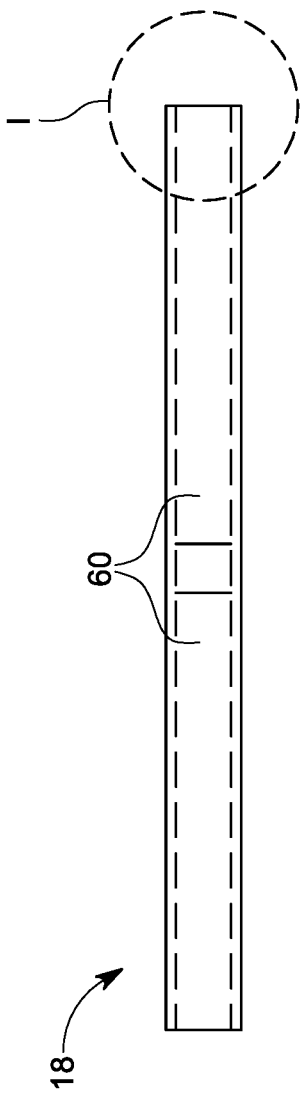

:

RECREATIONAL VEHICLE COMPONENT WITH IMAGE AND METHOD OF MANUFACTURING

TECHNICAL FIELD AND BACKGROUND

Recreational vehicle (RVs) components, such as walls, including interior walls and sidewalls; floors; and ceilings, are often formed from laminated layers that are mounted (typically by an adhesive and fasteners) to a frame, such as an aluminum frame, with an insulation layer inserted in the frame between the laminated layers. The insulation layer is typically formed from foam blocks that are placed in the frame before the laminated layers are secured to the frame. In some RVs, the sidewalls are formed from fiberglass reinforced panels, often referred to as "free hung" panels. They too are laminated layers, but have the added reinforcement of fiberglass so that they can be directly mounted to the frame of an RV without the internal frame work described above.

Depending on the application, the lamination layers may vary. For example, for a floor, the laminated layer that is used to form the visible and decorative side of the floor includes a sheet of vinyl laminated onto a layer (or two layers) of wood, such as lauan wood, which is then mounted to the upper side of a frame, such as wood frame or an aluminum frame. The fame may include foam inserts to provide insulation. The vinyl sheet is a continuous sheet that extends over the entire floor of the RV so that the same pattern is visible in all parts of the RV. The underside of the frame may be covered by two or more layers of lauan, which are then wrapped using a water proof barrier, typically a polymer coated woven sheet. The floor is then mounted to the vehicle chassis by fasteners.

For a sidewall, as noted above, the sidewall may be formed as free hung panel, which is a built up lamination of gel coat, fiber glass fibers and resin, and lauan panels, which are cured together to form the panel. Other sidewalls, as noted, are formed from laminated layers (or laminations) mounted to a frame, which is internal to the structural panel. The laminated layer that forms the exterior surface (the "A surface") of the sidewall similarly typically includes at least one layer of wood, such as lauan wood, which is then laminated with a fiber reinforced polymer (FRP) sheet, which forms the exterior surface or "A surface" of the sidewall, and then mounted to the frame by an adhesive and fasteners. The interior side of the frame also includes a lamination of lauan wood and paper to form the interior surface of the sidewall ("the decor panel"), which is similarly mounted the interior side of the frame, as noted, by adhesive and fasteners.

In order to decorate the exterior surface of the RV sidewalls, today's RV industry applies vinyl printed labels or applies custom painted graphics, or in a few instances a combination of both. In each of these situations, it is necessary to apply a "sticker" or "mask" to the surface of the RV sidewall in order to achieve the desired effect.

Recreational vehicle assembly has been historically manual. While using various discrete machines to perform some of the assembly functions—such as drilling holes, fastening, welding, rolling and/or pressing—much, if not all, of the placement of the floors, walls and components mounted to the floors and walls is controlled by manual placement based on manual measurements, including placement of the stickers and masking. Hence, even when the same design is used, the appearance of any two RVs may vary. Further, when repairs are required, the repair may be hard to match up with the surrounding design and, as a result, may introduce more variation.

In addition, once a floor is secured to the chassis, holes for plumbing, wiring, and vents are drilled through the floor to direct the piping, wiring and/or duct to the appropriate location within the cabin. Again, the drilling of these various holes are based on manual measurements. Because the location of these holes is determined manually, the location of these holes may vary from the desired location, possibly resulting in rework and/or repair. Hence, even when the same layout is used, the location of the walls, components, and holes in any two RVs may vary.

Accordingly, there is a need for RV components and a method of manufacturing RV components that will provide greater accuracy for assembly thus resulting in improved uniformity in the final product and improved repeatability in the process.

SUMMARY

Accordingly, in one embodiment a structural panel for a recreational vehicle includes a plurality of layers laminated together to form a lamination. The lamination forms an outer surface of the structural panel. The structural panel is configured to form a sidewall, a ceiling, or a floor of the recreational vehicle when mounted in the recreational vehicle relative to the vehicle chassis. The structural panel further includes an image that is formed on or in one of the plurality of layers in or internal to the structural panel and which is visible at the outer surface. The image is in a location that is in a known fixed registry with a structural reference, such as the outer perimeter, of the structural panel prior to the panel being mounted in the recreational vehicle wherein the location of the image is known relative to the structural reference of the structural panel.

In one aspect, the structural panel further comprises a frame, with the lamination mounted to the frame.

In some embodiments, the image comprises a decorative image or an installation reference guide. For example, the installation reference guide may comprise a drill hole location guide for drilling a hole in the structural panel. Alternatively, or in addition, the reference guide may comprise a line, which forms a reference line for aligning a component relative to the structural panel in a location known in fixed registration with the structural reference of the structural panel.

In another embodiment, the image comprises a collection of shapes, lines, and/or dots to form a readable image. For example, the readable image may comprise a barcode.

In other aspects, the plurality of layers includes a layer of wood and a layer of FRP, and the image is on or in the layer of FRP. Optionally, the plurality of layers further includes at least one protective coating, such as a curable protecting coating, including a UV curable protective coating, sprayed or rolled over the printed layer of FRP, which can provide scratch resistance, UV resistance, and/or chemical resistance. Suitable coatings may include epoxy or urethane based UV curable coatings. For example, in some embodiments the coating may be a clear or translucent protecting coating or a tinted protective coating. In some embodiments, the coating may be a clear gel coat.

In another embodiment, a structural panel for a recreational vehicle includes a plurality of layers laminated together to form an outer surface of the structural panel. The structural panel is configured to form a floor of the recreational vehicle when mounted in the recreational vehicle relative to the vehicle chassis. The structural panel further includes a first image formed on or in one of the plurality of layers in or internal to the structural panel and which is visible at the outer surface. The first image forms a first pattern in a location in a known fixed registry with the outer perimeter of the structural panel prior to the panel being mounted in the recreational vehicle, wherein the location of the first image is known relative to the outer perimeter of the structural panel. The structural panel also includes a second image formed on or in one of the plurality of layers in or internal to the structural panel and visible at the outer first surface. The second image forms a second pattern in a location in a known fixed registry with the outer perimeter of the structural panel prior to the panel being mounted in the recreational vehicle wherein the location of the second image is known relative to the outer perimeter of the structural panel.

In one aspect, the structural panel further comprises a third image formed on or in one of the plurality of layers in or internal to the structural panel and which is visible at the outer surface. For example, the third image may be in a location in a known fixed registry with the outer perimeter of the structural panel prior to the structural panel being mounted in the recreational vehicle wherein the location of the third image is known relative to the outer perimeter of the structural panel.

In other aspects, the third image comprises a collection of shapes, lines, and/or dots to form a readable image, with the readable image comprising a readable image selected from the group consisting of barcodes and wording.

According to yet another embodiment, a method of forming structural panel for a recreational vehicle includes providing a plurality of layers, with one of the layers comprising a printable layer formed from an ink printable material, forming a lamination from the layers, reinforcing the lamination to form a structural panel, and forming an optical reference or structural reference. The method further includes printing an image on the printable layer at a known location in fixed registry with the optical reference or the structural reference.

In one aspect, the step of printing is done prior to forming the lamination.

In another aspect, the step of forming an optical reference or structural reference comprises forming an optical reference.

In further embodiment, the printable layer has a first side and a second side, wherein the forming an optical reference comprises printing an image on the second side of the printable layer, and wherein the printing the image of the first side comprises printing the image on the first side of the printable layer at a known location in fixed registry with the optical reference on the second side of the printable layer.

In another aspect, the printing is done prior to reinforcing the lamination.

In an alternate aspect, the printing is done after reinforcing the lamination.

According to yet another embodiment, a structural panel for a recreational vehicle includes a plurality of layers laminated together to form an outer surface of the structural panel, which is configured to form a sidewall, a ceiling, or a floor of the recreational vehicle when mounted in the recreational vehicle relative to the vehicle chassis. The structural panel also includes an image formed on or in one of the plurality of layers in or internal to the structural panel and visible at the outer first surface, with the image including readable information about the recreational vehicle or a component to be mounted in the recreational vehicle.

In one aspect, the image comprises a plurality of shapes and/or lines forming a barcode, wherein the image is machine readable. For example, the image includes machine readable information about the vehicle and a component to be mounted in the recreational.

In another aspect, the structural panel also includes a second image formed on or in one of the plurality of layers in or internal to the structural panel and which is visible at the outer surface. For example, the second image may include installation instructions for the component.

In another aspect, the structural panel further includes a second image formed on or in one of the plurality of layers in or internal to the structural panel and which is visible at the outer surface. The second image is in a location in a known fixed registry with the outer perimeter of the structural panel prior to the panel being mounted in the recreational vehicle wherein the location of the second image is known relative to the outer perimeter of the structural panel.

For example, the second image may comprise an installation reference guide, such as an installation reference guide for installing the component relative to the structural panel.

In one aspect, the installation reference guide comprises a line, which forms a reference line for aligning the component relative to the structural panel.

In another embodiment, a method of forming structural panel for a recreational vehicle includes providing a plurality of layers, with one of the layers comprising a printable layer formed from an ink printable material. The method further includes forming a lamination from the plurality of the layers, with the lamination having an exterior surface that forms an exterior surface of the structural panel, reinforcing the lamination to form the structural panel, and printing a readable image in or on the printable layer in or internal to the structural panel. The readable image has information about the recreational vehicle and/or a component to be mounted relative to the structural panel and is viewable and readable at the exterior surface of the structural panel when the structural panel is formed.

In one aspect, the printing is done prior to forming the lamination.

In another aspect, the printing is done prior to reinforcing of the lamination.

In an alternate embodiment, the printing is done after forming the lamination.

Optionally, the printing is done after reinforcing of the lamination.

In another aspect, printing a readable image comprises printing a first image, further comprising printing a second image on the printable layer.

For example, the printing the second image includes printing instructions on the printable layer.

In another embodiment, printing the first image comprises printing a readable image having information about the recreational vehicle and a component to be mounted relative to the structural panel. For example, printing instructions may include printing instructions for the installation of the component relative to the structural panel.

Optionally, in another embodiment, printing a second image includes printing an installation reference guide, such as a line for forming a reference line for aligning the component relative to the structural panel.

In another embodiment, a method of assembling a recreational vehicle includes providing a structural panel for installation in the recreational vehicle, which has a surface and a readable image in or internal to the structural panel, with the readable image being located at or near a location on the surface of the structural panel for installing a component at the location. The readable image has to-be-installed component information about the component to be installed at the location and is readable at the surface of the structural panel. The method further includes reading the readable image to determine the to-be-installed component information about the component that is to be installed at the location on the surface of the structural panel.

In one aspect, reading includes scanning the readable image to determine the to-be-installed component information about the component that is to be installed at the location.

In another aspect, the method further includes determining whether a correct component has been installed on the surface of the structural panel.

According to yet a further aspect, the determining includes scanning the installed component for installed component information and comparing the installed component information to the to-be-installed component information.

In one aspect, the method further includes displaying the to-be-installed component information.

In another aspect, the method further includes scanning the installed component for an identification of the installed component and storing the identification of the installed component.

In yet another aspect, the method further includes associating the identification of the installed component with the vehicle information.

In one embodiment, the method further includes generating a read/write chip, such as a read/write RFID tag, containing the identification of the installed component and the vehicle information.

In yet another embodiment, a method of handling a recreational vehicle includes receiving a recreational vehicle, which has a vehicle identification, a chassis, a plurality of wheels, and a cabin, with the cabin including a least one structural panel having a surface, an installed component mounted at the surface of the structural panel, and a readable image, which is located at or near the installed component and has installed component information relative to the installed component. The method further includes inspecting the recreational vehicle for defects or damage. When a defect or damage in the installed component is found, the method includes: scanning the readable image to identify the installed component as a defective or damaged component; replacing the defective or damaged component with a replacement component; scanning the replacement component for replacement component information; and associating the replacement component information with the vehicle identification.

In one aspect, the vehicle identification and installed component information is stored in a database, and the method further includes storing the replacement component information in the database in association with the vehicle identification.

In another aspect, the method further includes providing a link to a brochure, a video, or a manual.

For example, the link may be provided on a hand held device, such as a smartphone.

In one aspect, providing a link is done in response to scanning the readable image.

In any of the above, the method further includes storing the vehicle identification and installed component information and/or the replacement component information in a database.

In another embodiment, a method of servicing a recreational vehicle includes the recreational vehicle having (1) a vehicle identification, a chassis, a plurality of wheels, and a cabin, the cabin including a least one structural panel having a surface, (2) an installed component mounted at the surface of the structural panel, and (3) a readable image, the readable image being located at or near the installed component and having the vehicle identification and installed component information relative to the installed component, and wherein the method includes scanning the readable image with a handheld device, such as a smartphone, and providing a link for the smartphone to an instructional reference, such as a video brochure or manual, relative to the recreational vehicle and/or the component.

In one aspect, the handheld device has an application, and the scanning includes uploading the vehicle identification and installed component information to the application.

In a further aspect, the method further includes contacting a dealer or OEM for technical support.

According to yet another embodiment, a method of maintaining a recreational vehicle, in which the recreational vehicle has (1) a vehicle identification, a chassis, a plurality of wheels, and a cabin, with the cabin including a least one structural panel having a surface, (2) an installed component mounted at the surface of the structural panel, and (3) a readable image, with the readable image being located at or near the installed component and having the vehicle identification and installed component information relative to the installed component, and wherein the method includes scanning the readable image with a handheld device, such as a smartphone, wherein the handheld device has an application, uploading the vehicle identification and installed component information to the application, and receiving notification on the handheld device regarding the status of the recreational vehicle or the installed component.

In one aspect, the notification may provide (1) details on the basis for notification and/or (2) a recommended action.

In any of the above, the notification may provide a referral to a service provider.

Accordingly, a structural panel and method of making a structural panel for RV is disclosed that can provide greater accuracy for assembly and improved repeatability.

DETAILED DESCRIPTION OF THE FIGURES

FIG. 2B is an enlarged view of detail 2B of FIG. 2;

FIG. 3A is an exploded perspective view of a sidewall illustrating the various layers, frame, and insulation of the sidewall;

FIG. 3B is an elevation view of an inside of the sidewall of FIG. 3A;

FIG. 3C is an end elevation view of the sidewall of FIG. B;

FIG. 3D is an elevation view of the exterior of the sidewall of FIG. 3A;

FIG. 3E is an enlarge view of detail 3E of FIG. 3C;

FIG. 3F is an enlarged elevation view of a section of the sidewall;

FIG. 3G is an end view of the sidewall section illustrated in FIG. 3F;

FIG. 3H is a top plan view of the sidewall section illustrated in FIG. 3F;

FIG. 3I is an enlarged view of detail 3I of FIG. 3H;

DETAILED DESCRIPTION

Figure 1:
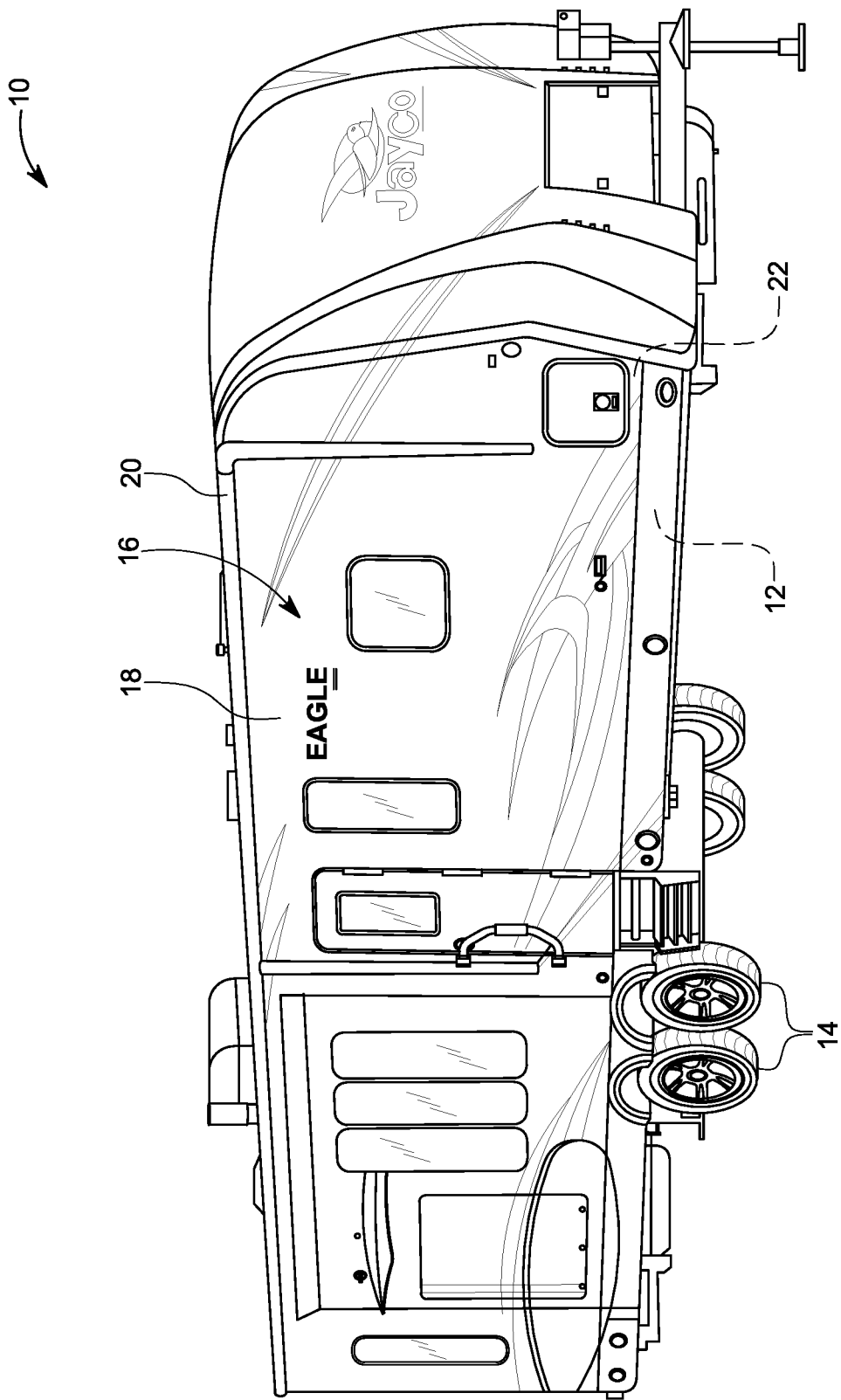
FIG. 1 is a perspective view of a recreational vehicle.

Referring to FIG. 1, the numeral 10 generally designates a recreational vehicle (RV). Recreational vehicle 10 includes a chassis 12, a plurality of wheels 14, which are mounted to chassis 12, and a plurality of structural panels 16, which may form sidewalls 18, a ceiling/roof 20, and floor 22 (see FIG. 2), which when assembled together form the RV cabin and which is mounted to the chassis 12. As will be more fully described below one or more of the structural panels 16 may be formed with an image either in or internal to the structural panel, but which is visible at the surface of the structural panel to provided information, such as installation information, or to provide an aesthetic appearance to structural panel.

Referring to FIGS. 2 and 2A-2C, in the illustrated structural panel 16 is configured as a floor panel 22 and includes one or more images 24, 26, 28, 30, 32, 34, and/or 36. The term "image" is used broadly herein to include a design, such as a pattern (such as image 24, and image 26), a geometric shape (such as images 28), a line (36), a photograph, a collection of shapes, dots, or lines, for example, that form readable image, such words (image 34), an icon or symbol (e.g. an international symbol, such as a warning symbol), or a code, including a barcode (such as images 30, 32). Images 24, 26, 28, 30, 32, 34, and/or 36 are formed in or interior to structural panel 16, using one of the printing processes noted below. The term "readable" is used broadly to include machine readable or readable by a person.

In the illustrated embodiment, images 24 and 26 comprise designs that are representative of a desired floor pattern, such as a wood floor or a tile floor pattern. While only two floor patterns are illustrated, it should be understood that additional or different floor patterns may be provided. As will be more fully described below, by forming images 24 and 26 during the structural panel forming process, floor 22 appears have two different floor patterns but without any seams and, instead, is formed as a continuous layer that extends across floor 22. Thus, this printing process provides the ability to incorporate multiple flooring design/patterns and, hence, multiple floor plans, into a single unit versus one continuous piece of linoleum where the same pattern is visible in all parts of the RV or two or more discrete pieces of linoleum, but with the linoleum pieces joined together with seams.

In addition to images 24 and 26 that provide an aesthetic appearance to structural panel 16, structural panel 16 may include a plurality of images that provide information and/or data. Again referring to FIGS. 2 and 2A-2C, floor 22 may include images 28, 34, and 36 in the form of installation reference guides. The term "installation reference guide" is used broadly to include a line, lines, including intersecting lines, circles, and/or wording that provide guidance to an installer on what to install or where to install a component that is to be mounted to the floor 22. For example, in one embodiment, the image may be in the form of wording, such as instructions, technical specifications, weights, or dates or the like. In another embodiment, the wording may be in the form of warnings for the intended user, for example.

Figure 2:
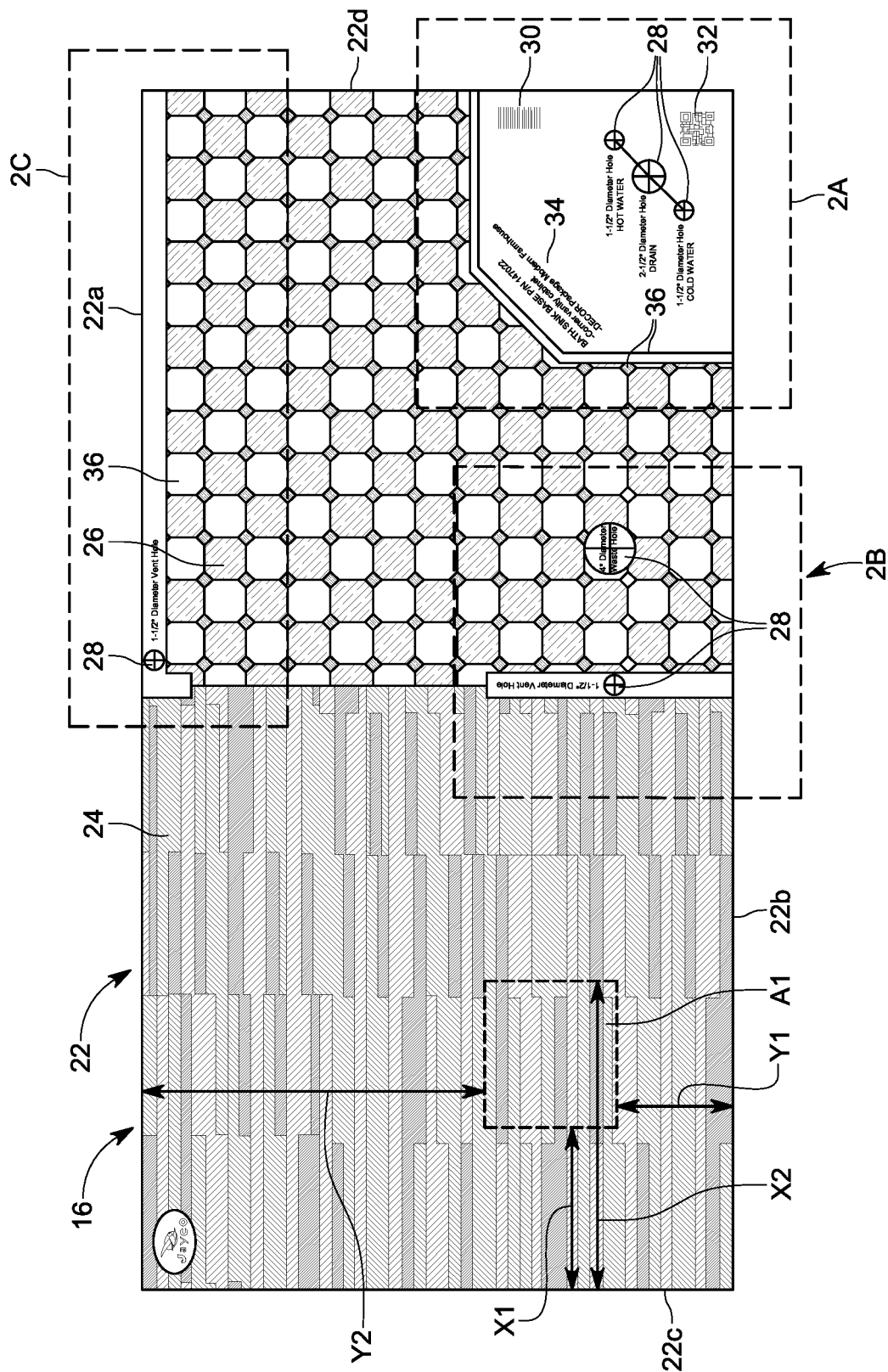
FIG. 2 is a top plan of one embodiment of a floor of a recreational vehicle.
Figure 2A:
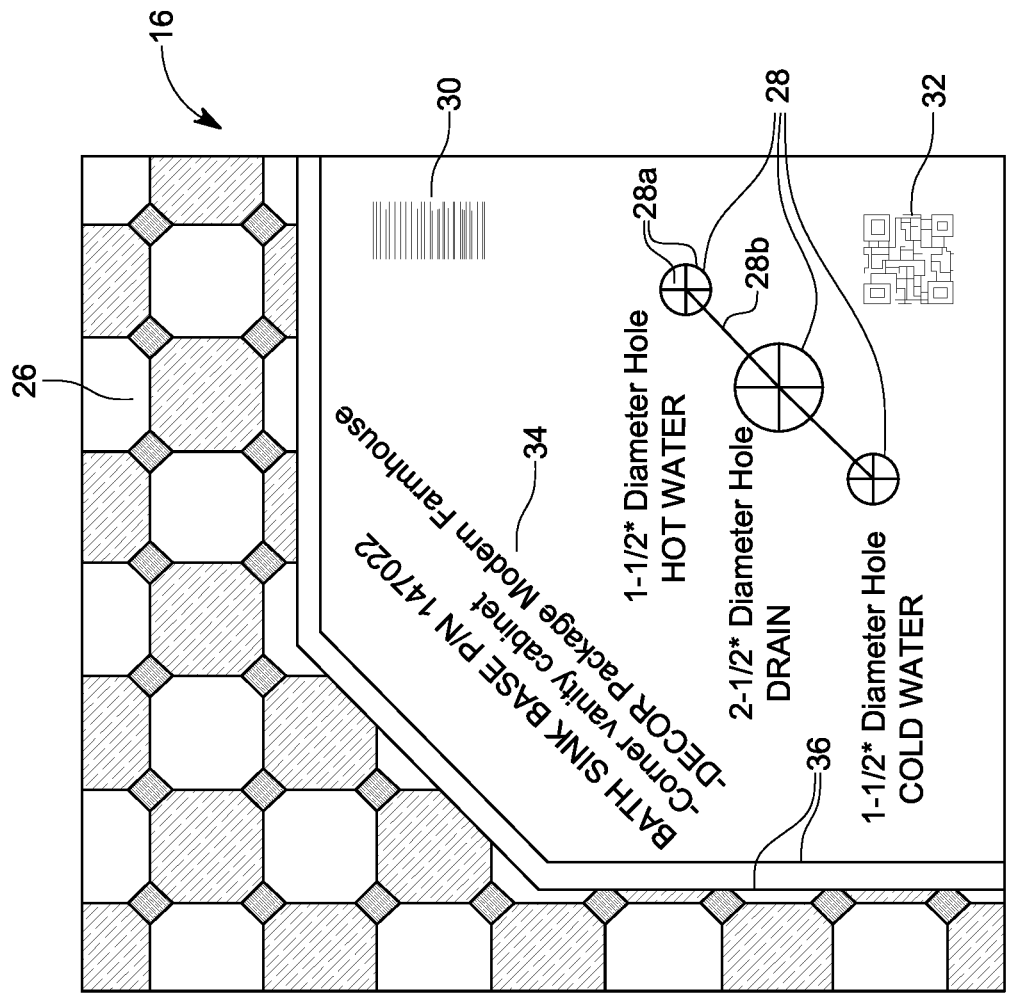
FIG. 2A is an enlarged view of detail 2A of FIG. 2.

Referring to FIG. 2A, in the illustrated embodiment, images 28 are in the form of geometric shapes, such as circles, with intersecting lines 28a that designate the center of the respective shape. Images 28 may be to provide accurate locations of holes to be drilled in the structural panel for conduits, for plumbing and/or ventilation, and wiring. For example, the diameter of the circles may be sized so that they represent the diameter of the hole to be drilled. Optionally, additional images, such as line 28b, may be provided to further assist in the drilling of the holes.

In the illustrated embodiment, images 36 are in the form of lines. The lines may be used as alignment lines and are provided to instruct an installer where to align components, such as interior walls, for example, by aligning the wall on images 36, to assure that the interior wall is installed in the correct location on floor 22.

Figure 2C:
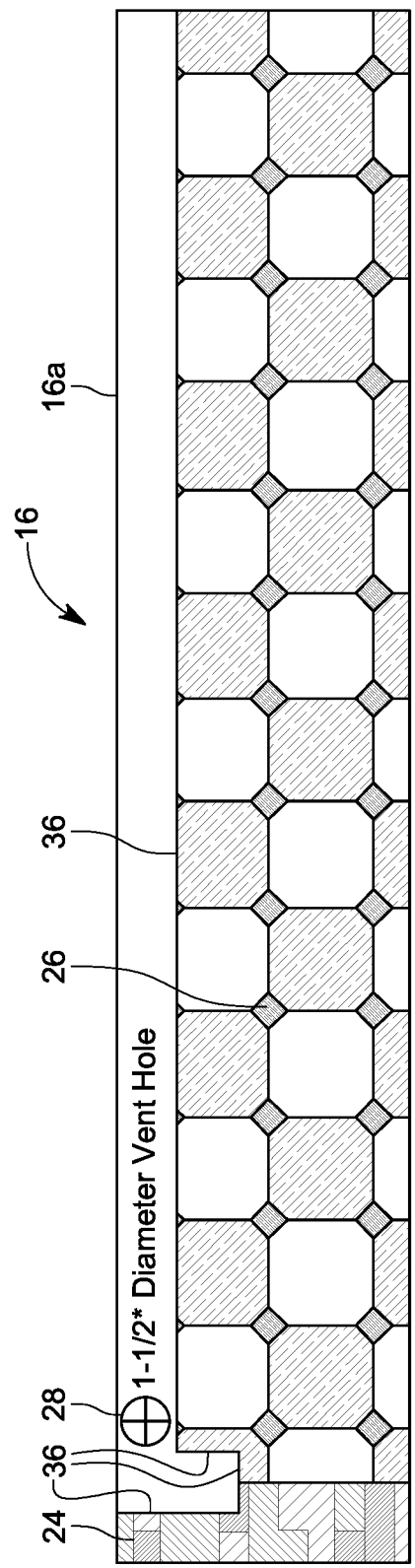
FIG. 2C is an enlarged view of detail 2C of FIG. 2.

Referring to FIGS. 2B and 2C, images 28 may be located between images 36, or between image 36 and an edge 22a of floor 22, to provide locations of holes that are to be drilled for conduits intended to run through interior walls.

In the illustrated embodiment, images 30 and 32 are configured as readable code, such as barcodes. The term "barcode" is used broadly to include one dimensional and two dimensional barcodes, such as barcodes formed from a plurality of lines (or bars) or barcodes formed from a plurality of shapes, such a Qcodes, QR codes, DotCodes, EZcodes, or the like, as well as color barcodes. Images 30 and 32 are similarly printed in floor 22 and contain information about a component to be installed (such as the type of component, model number, and Serial Number) either at or adjacent the respective image, and optionally information about the vehicle in which the component is to be installed, namely the vehicle identification number ("VIN").

Figure 2D:
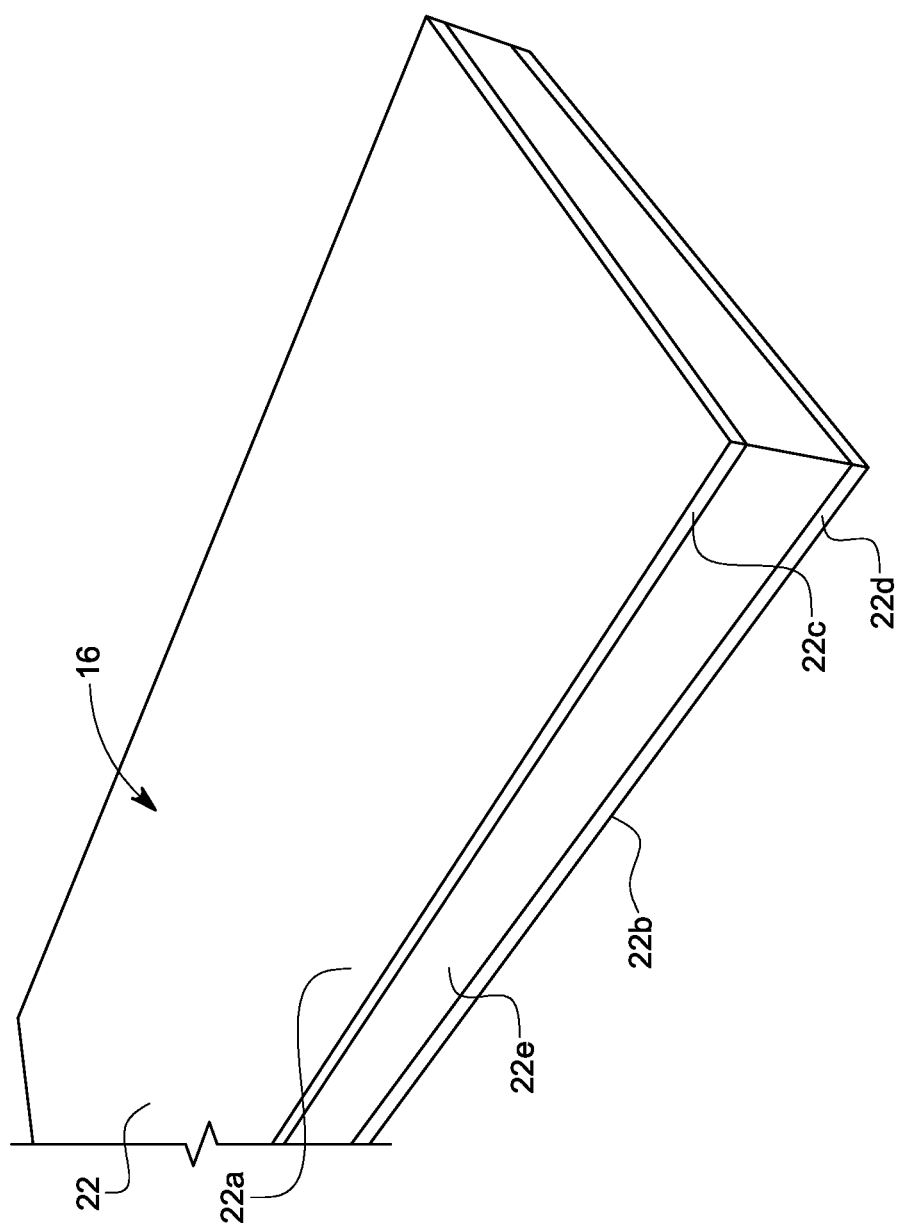
FIG. 2D is a perspective view of a section of one embodiment of a structural panel for use as a floor.

Referring to FIG. 2D, structural panel 16 that forms floor 22 may be made from a plurality of layers 22a, 22b, 22c, and 22*d* and a reinforcing layer 22*e*. For example, a suitable reinforcing layer 22*e* may comprise a foam layer, such as a polyethylene teraphthalate (PET), expanded polystyrene (EPS) or Honeycomb foam layer. Layers 22*a* and 22*c* may be laminated together to form a top lamination, and layers 22*b* and 22*d* may be laminated together to form a bottom lamination, both of which are then adhered to reinforcing layer 22*e*, using an adhesive, heat and pressure, or may be assembled using any of the processes described below.

Figure 2E:
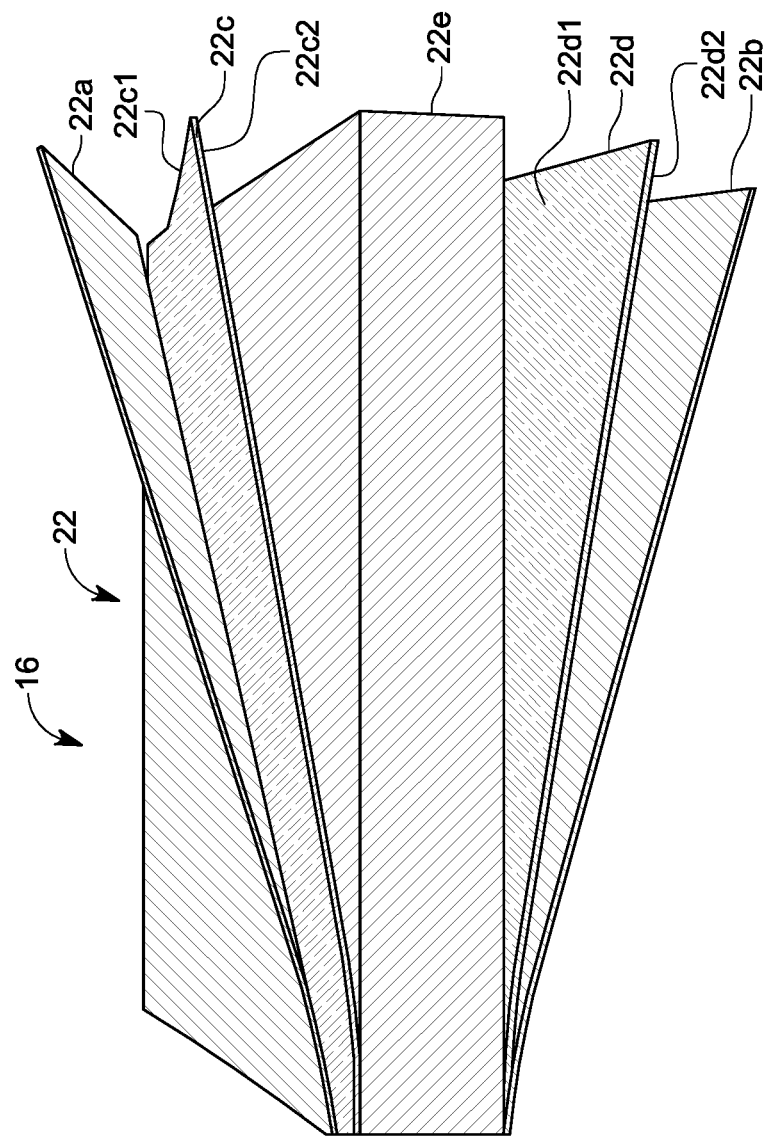
FIG. 2E is a similar view to FIG. 2D with the layers peeled back to illustrate the various layers forming the structural panel.

Referring to FIG. 2E, for example, layers 22*a* and 22*b* may comprise a film, such as polymer or plastic film, including a polyethylene teraphthalate (PET) film. Layers 22*c* and 22*d* may each comprise one or more fiber reinforced polymer sheets 22*c*1, 22*c*2, and sheets 22*d*1 and 22*d*2 (FIG. 2E), respectively, such as fiberglass reinforced PET sheets. Further, when formed from multiple sheets, the sheets may be arranged so that the direction of the fibers in each sheet 22*c*1, 22*d*1 may be oriented at angle, such as forty five degrees or ninety degrees, with respect to the fibers in sheets 22*c*2, 22*d*2 to increase the strength of the respective layer 22*c*, 22*d*, and hence of structural panel 16.

In one embodiment, layers 22*c*, 22*d* may be formed from a mat of woven fibers, such as a mat of woven fiberglass fibers, which are mounted to reinforcing layer 22*e*. For example, reinforcing layer 22*e* may be formed from foam and, further, formed from a plurality of foam panels that are positioned in side-by-side relationship, such that their total length and/or width is sufficient to form the entire prior structural panel. On the other hand, each layer 22*c*, 22*d* is sized to cover the entire length and width of each structural panel.

Prior to attaching the mats to reinforcing layer 22*e*, the mats are run through a bath of resin, such as fiberglass resin, for example, on rollers. Optionally, any excess resin may be removed using a screed apparatus prior to attaching the mats to the reinforcing layer 22*e*. Once soaked in the resin (and optionally after the excess resin is removed), the mats are then placed on the top and bottom sides of reinforcing layer 22*e* and, thereafter, are placed in a press to remove any additional excess resin and any air bubbles that may have formed. After pressing layers 22*c*, 22*d* and reinforcing layer 22*e* in a press, the layers form a lamination. Thereafter, layers 22*a* and 22*b*, for example, the PET films noted above, may be laminated onto layers 22*c*, 22*d* using an adhesive and, optionally, heat and/or pressure onto each side of the lamination, thus forming the structural panel.

As would be understood, other constructions or methods of forming structural floor 22 may be used, including floors formed from a printable layer laminated onto wood layers, similar to the construction described in reference to the sidewalls below, which are then mounted to a frame, such as a wood or aluminum frame, using fasteners and/or an adhesive. The frame may have insulation, for example, foam inserts placed between the frame members prior to attaching the laminations onto the frame.

As noted above, floor 22 may include one or more images, such as images 24, 26, 28, 30, 32, 34, and/or 36, using a printing process. Depending on the printing process, the images may be either in or interior to the structural panel 16 forming floor 22 (i.e. printed on an internal layer) or may be formed in the exterior surface of the structural panel forming floor 22 the image is in the materials forming the exterior surface (rather than on the surface).

For example, in one embodiment, the images are printed using an ink printer, such as inkjet printer. When using an ink printer, the printed images are printed on the applied surface. When the images are printed on the applied surface, one or more additional layers of a protective coating, such as a curable protecting coating, including a UV curable protective coating, may be applied to the printed surface, such as by rolling or spraying, which can provide scratch resistance, UV resistance, and/or chemical resistance. The protective coating provides a smooth surface on the exterior surface of the structural panel and, further, can provide an extended wear coating that provides long-term protection of the printed images. Thus, the image is internal to the structural panel. Suitable coatings may include epoxy or urethane based UV curable coatings. For example, in some embodiments the coating may be a clear or translucent protecting coating or a tinted protective coating. In some embodiments, the coating may be a clear gel coat.

The panels may be printed as individual panels, which are typical 4 or 5 feet wide by 8 feet tall, but vary in length from 15 feet to 40 or more feet. Alternately, the structural panels may be printed in series, for example, by roll-to-roll printing. A suitable printer includes a wide format printer, such as a wide format inkjet printer that is commercially available from VUTEK.

Alternately, the images may be applied using dye sublimation printing. Dye sublimation printing is the process of taking a gel based dye-sub ink and converting it to a gas dye through the addition of heat, which will then dye the fibers, such as the polyester fibers and resin, of the printable layer. There are two dye-sub processes: Indirect and direct. Indirect dye-sublimation is where a sheet of paper is printed (reverse image) and then placed face against the surface of the item to be imaged, and then heat/pressure is applied to gasify the ink and transfer the image on the surface. In direct dye-sublimation, the ink is printed directly onto the surface to be imaged and then heat/pressure is applied to gasify the ink and transfer the image. In short, because the printed image can be heat dyed into the fiber-based material, such as polyester, the image is in the layer of material. In other words, when using dye sublimation, the image is formed in the surface that is being printed.

Referring again to FIG. 2E, the image may be printed on or in layer 22*c* (e.g., on sheet 22*c*1) or on or in layer 22*a*. When printed on layer 22*a* (such as by using conventional ink printing), then as noted above, an additional protective layer formed by a protecting coating may be applied to layer 22*a*. As noted above, a suitable protective coating is a curable protecting coating, including a UV curable protective coating, applied such as by rolling or spraying, which can provide scratch resistance, UV resistance, and/or chemical resistance. Further, the coatings may include epoxy or urethane based UV curable coatings. For example, in some embodiments the coating may be a clear or translucent protecting coating or a tinted protective coating. In some embodiments, the coating may be a clear gel coat. The protective coating can provide a smooth surface on the exterior surface of the structural panel and, further, can provide an extended wear coating that provides long-term protection of the printed images. Thus, the image is internal to the structural panel.

In contrast, when printing layer 22*a* using dye-sublimation no additional coating need be provided, though additional protective layers may be added.

Regardless of the type of printing, as will be more fully described below, one or more of the images (e.g., images 24, 26, 28, 30, 32, 34, and/or 36) may be printed in fixed registry or registration relative to either an optical reference of a known location on structural panel 16 or relative to a structural reference of structural panel 16, which also provides a known location on the panel. In this manner, the precise location of the image is known.

Thus, when the image is an installation reference guide, such as a line or a circle, the proper location of components to be installed and/or holes to be drilled may be precisely known, which allows for a more accurate assembly process, as well as a repeatable assembly process.

Similarly, when the image is a design, such as shown in FIG. 2 (as well as FIG. 3 more fully described below), the precise location of the image is known. Further, when this location is stored in a computer and referenced to an image file of the design, which has the precise location of the pixels that make up the image, repairs on the structural panels with such images (of known location) can be precise so that the repaired image matches the surrounding image.

For example, referring to FIG. 2, if an area of the floor is damaged, such as in area A1, measurements X1, Y1, and X2, Y2 may be taken of the location of the area A1, which measurements are taken in reference to a fixed reference (structural or optical) of structural panel 16, for example, the lateral edges 22a, 22b and end edges 22c, 22d of floor 22. Once the measurements are taken, the measurements may be entered in to the computer, which is configured (e.g. via software) to reference the file image of the design (of image 24) so that the portion of the image that corresponds to the damaged area (and slightly greater area) may be identified and printed on a substrate that is the same, or is a suitable replacement, of the substrate on which the original image is printed (e.g. PET film and/or the fiber reinforced mat or the other layers describe below in reference to side wall 18) and that matches the pattern precisely in area A1. To provide tolerance for the installation of the repair, area A1 is typically selected so that it extends beyond the actual damaged area and, further, may follow lines of the design and not necessarily be a rectangle, or a regular geometric shape.

Once the repair insert is formed and the damage portion of area A1 is cut out of the panel 16, the repair insert may be trimmed so that it fills the cutout portion of panel 16 and, then, is secured in place by an adhesive. Optionally, the repaired area may then be coated by a protective coating, such as described above.

Where the original image is printed using dye sublimation, a repair would first be completed on the damage area to bring the surface back to level and smooth to its original and surrounding surfaces. A polyester resin based clear coating would then be applied to the repaired area. And, then the image, using the image file referencing (as outlined above), is applied to the repaired area using dye sublimation, for example, using the indirect method described above. For example, the reverse image may be printed on a substrate and then transferred onto the repair area by applying heat and pressure to the substrate when aligned on the repair area to "re-dye" the image into the repaired area.

As noted above, structural panel 16 may be configured as a sidewall 18, and may be formed using the same or similar method described above in reference to the structural panel that forms floor 22. Alternately, sidewall 18 may be constructed from a frame and laminations or may be constructed as a "free hung" panel described below. Similarly, floor 22 may be formed from a similar frame based construction as the sidewall.

Figure 3:
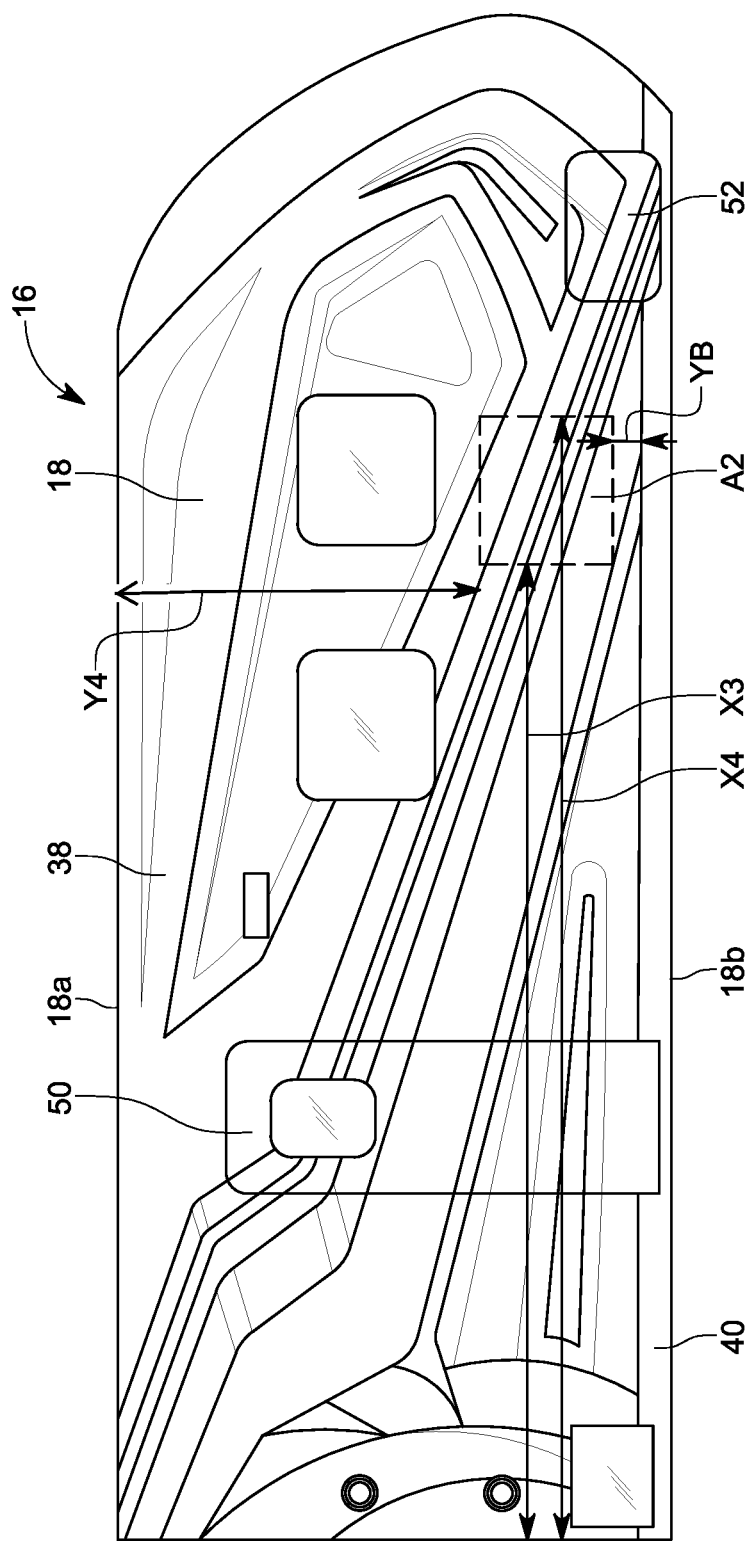
FIG. 3 is an elevation view of one embodiment of a sidewall of a recreational vehicle illustrating an image applied to the exterior surface of the sidewall.

Referring to FIG. 3, sidewall 18 may also be printed with one or more images 38, 40 that are referenced to one or more fixed references on the sidewall, for example, upper edge 18a, lower edge 18b, and/or end edges 18c, 18d of side wall 18. For example, in the illustrated embodiment, sidewall 18 includes two images 38, 40 that extend along the entire length sidewall 18 to provide an aesthetic appearance the whole side of the cabin. Images 38, 40 may be printed on sidewall 18 in the same manner described above in reference to the structural panel 16 that forms floor 22.

Again, because the images 38, 40 are printed in fixed registry with one or more fixed references, the precise location of images 38, 40 may be known using an image file (as described above). Therefore, similarly, when a repair is needed in sidewall 18, for example, in area A2, measurements X3, Y3, and X4, Y4 may be taken of the location of the area A2, which measurements are taken in reference to a fixed reference (structural or optical) of structural panel 16, for example, upper edge 18a, lower edge 18b, or end edges 18c, 18d of side wall 18. Once the measurements are taken, the measurements may be referenced to the file image of the design (of the effected image 38 or 40) so that the portion of the image that corresponds to area A2 may be printed on a substrate that is the same, or is a suitable replacement, of the substrate on which the original image is printed and that matches the pattern precisely in area A2. Again, after the damage area of sidewall 18 is cut-out, the repair insert is trimmed to suit the cut-out area. Once trimmed, the repair insert may then be inserted in to the cut out area and secured in place by an adhesive. Thereafter, the repaired area may be optionally coated with a protective layer, formed by a protective coating rolled or sprayed on. For further details of suitable protective coatings, reference is made to the above description.

In one embodiment, the damaged area may be repaired by a conventional filler, which is brought back to a smooth finish, and then covered with a sticker/decal that is printed with an image to cover the repair area. The image may be created using the image file referencing noted above that precisely matches the damaged area.

Referring again to FIG. 3, sidewall 18 includes one or more openings to form window openings and, further, to form openings for slide outs and doors, such as an entryway door 50 and/or a compartment door 52. Because the precise location of the design formed by image 38 is known relative to one or more fixed references on sidewall 18, once the locations of the opening for the slide out, entryway door 50 and the opening for compartment door 52 are known (e.g. referenced, for example by measuring, to the one or more fixed references on sidewall 18), the computer may reference the locations of these openings to the image file to determine what portion of the image must be then printed on the panel forming entryway door 50 and the panel forming compartment door 52, in a similar manner to the structural panels. In this manner, when doors 50, 52 are properly mounted in the respective openings, the images formed on the doors will precisely align with the surrounding image on the sidewall 18.

With a slide out, the panel that forms the slide out wall is typically cut from the panel forming the sidewall—so the images are aligned and look like one continuous image. However, if repair is need for the slide out wall, the replacement side out wall may be printed so that it precisely matches the surrounding image in a similar manner as described above. Optionally, the file image may have the slide out indicated already, eliminating the need to take the measurements noted above in reference to the repairs.

Referring to FIGS. 3A-3I, in one embodiment sidewall 18 may be formed from a frame 60, outer and inner laminations 62 and 64, and an insulation layer 66. Frame 60 may be formed from aluminum tubes that are welded together to form a rigid frame on which laminations 62, and 64 may be mounted using adhesive and/or fasteners. Insulation layer 66 is inserted into frame 60 prior to mounting laminations onto frame 60 and may be formed from one or more foam inserts, such as an expanded polystyrene (EPS) foam blocks.

Lamination 62 may be formed from a layer of wood 62*a*, such as a lauan wood layer, and a layer of polymer 62*b*, such as fiber reinforced polymer (FRP), which are joined together using an adhesive and then mounted to frame 60, as noted above, by an adhesive and/or fasteners. Lamination 62 forms the outer exterior surface of sidewall 18 and, therefore, forms the exterior surface of the cabin of the RV.

Lamination 64 may also be formed from a layer of wood 64*a*, such as a lauan wood layer, and a layer of paper 64*b*, which forms the interior surface of the sidewall 18 and, therefore, forms the interior surface of the cabin, which is otherwise known as "decor" panel. Optionally, lamination 64 may include one or more backers 70, which may be formed from metal, such as electrogalvanized sheet (EGS), or wood, and which provide a mounting surface for mounting components (e.g. cabinets) at the interior of sidewall 18.

Figure 4:
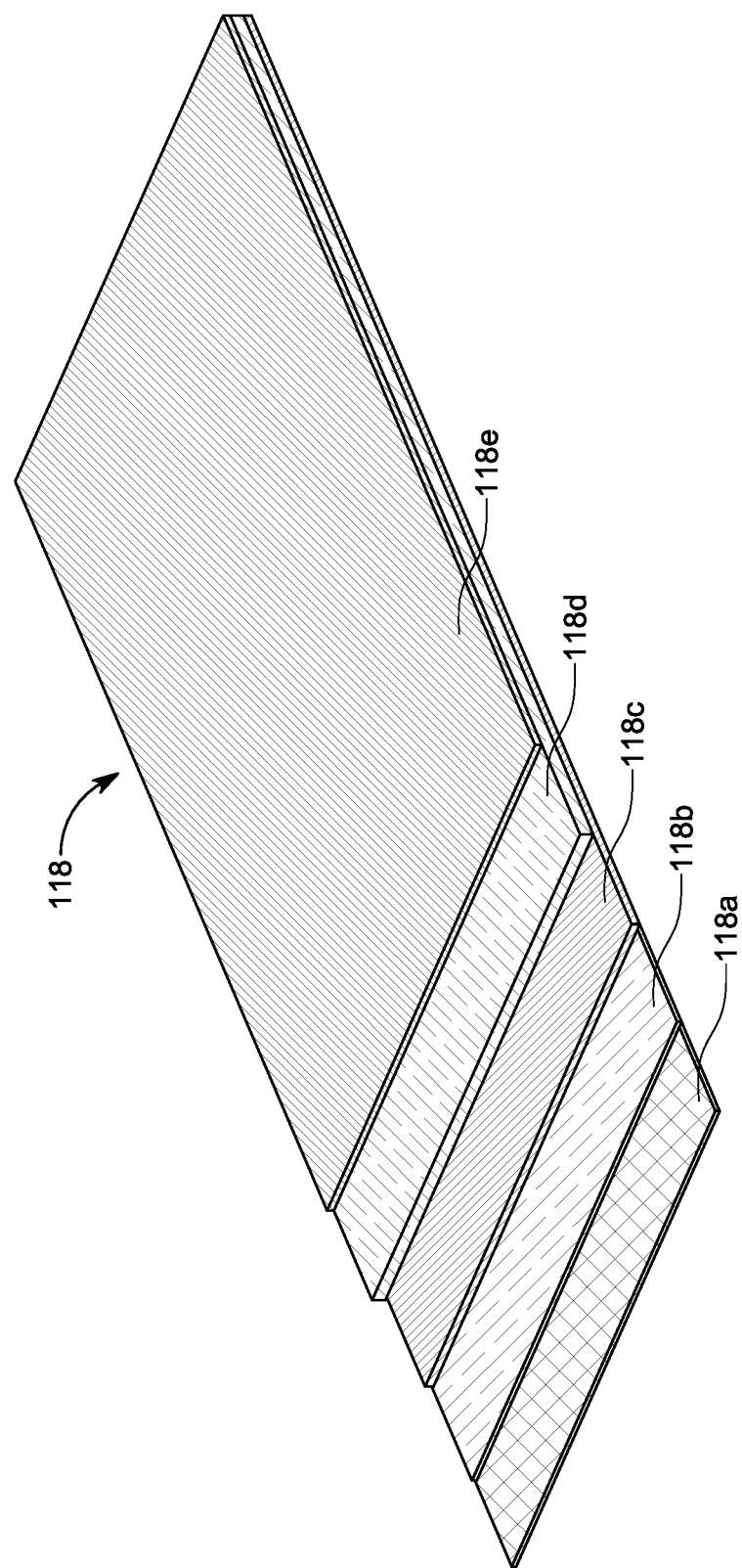
FIG. 4 is an exploded perspective of an FRP panel manufactured using the manufacturing process of FIG. 7.

Referring to FIG. 4, in another embodiment of the sidewall, sidewall 118 may be formed as a "free hung" FRP panel. Sidewall 118 comprises a lamination formed from one or more clear coats 118*a*, 118*b*, such as clear gel coats, a layer of chopped fiber and resin 118*c*, such as chopped fiberglass and fiberglass resin, a layer of wood 118*d*, such as a lauan board, and another layer of chopped fibers and resin 118*e*, such as chopped fiberglass and fiberglass resin. The process of forming the free hung FRP panel is described below in reference to FIG. 7.

In the illustrated embodiment, the image of various images may be printed in sidewall 118 either the inwardly facing side of first or second clear coat 118*a* or 118*b* using a reverse image. In this manner, the image is internal to the structural panels. Further, as will be more fully described below, the image will be printed in a fixed registry or registration relative to a fixed reference of the structural panel.

Figure 5:
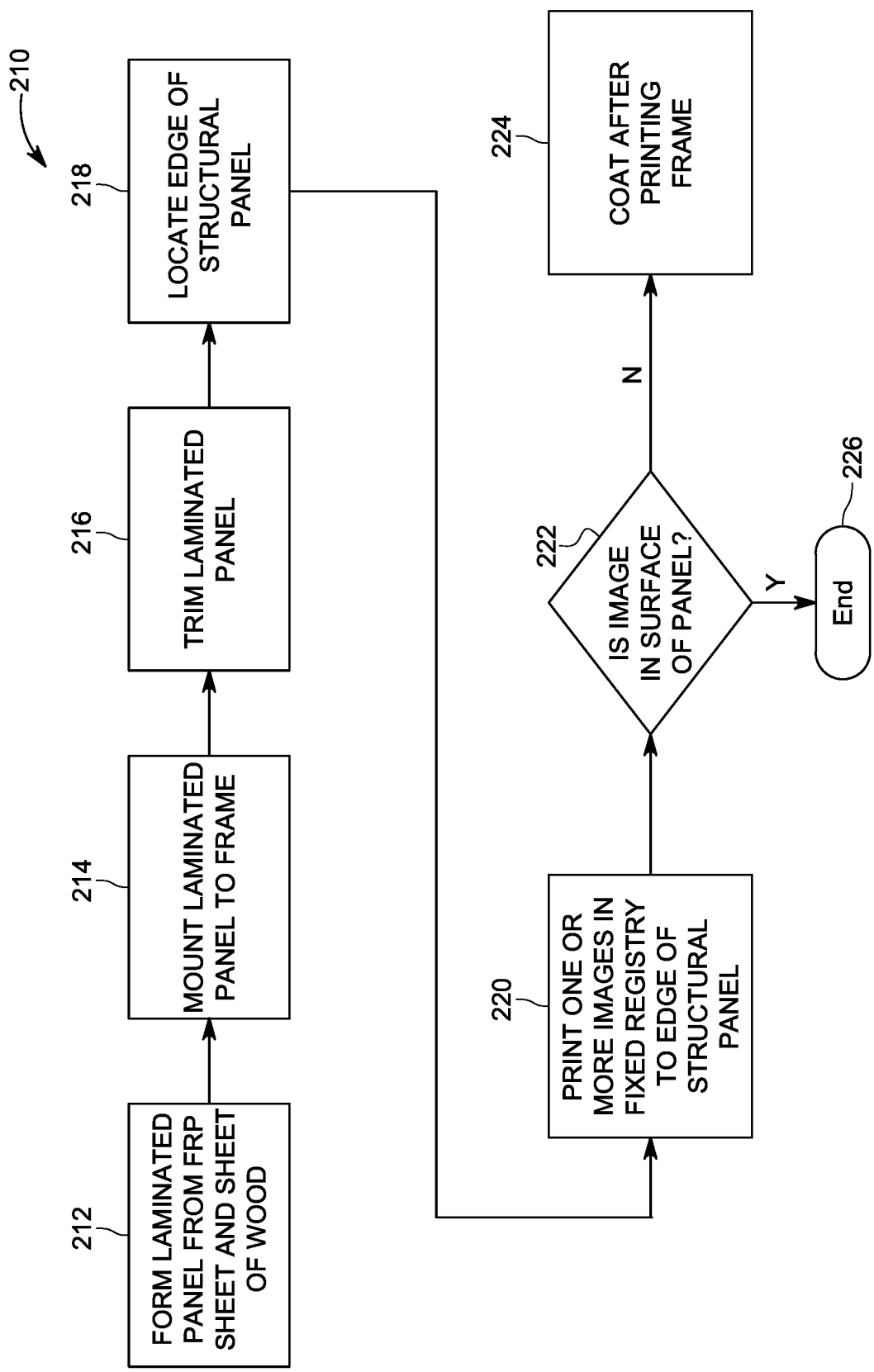
FIG. 5 is a flow chart of the process of one printing process for a structural panel.

As noted above, the structural panels described herein may have one or more images printed in or interior to the structural panel. The step of printing may be done at different stages of the structural panel manufacturing process. For example referring to FIG. 5, printing process 210 starts at step 212 with the formation of the laminated panel from an FRP sheet and a sheet of wood, such as laminated panel 62 described above. Once the laminated panel is formed, the laminated panel is mounted to the frame, such as frame 60 (214). After the laminated panel is mounted to the frame, the laminated panel is trimmed (216) so that its edges align with the outer perimeter of the frame. At step 218, the assembled laminated panel and frame are loaded into a printing apparatus, such as described above, with the edge of the structural panel located and aligned in the printing apparatus so that the printing apparatus can print one or more images in fixed registry to the edge of the structural panel (220).

Depending on the type of printing process that is used, e.g. inkjet printing or dye sublimation printing, the image may be formed on the surface of the structural panel or in the surface of the structural panel. If the image is applied on the surface of the panel (222), then an additional coating may be applied, such as a protective coating described above, over the printed surface of the structural panel (224). If the image is applied in the surface of the panel (222), then no additional coating is required.

Further, these additional costings may be used to create "depth" or texture. To create depth, multiple coatings may be applied. To create texture, the coating may be applied using a textured roller. Alternately, or in addition, the depth may be created by building up layers of the ink forming the image during the printing process. In other words, multiple layers of ink may be created by multiple printing passes using the printer.

An alternate embodiment of the method of printing the structural panel includes printing the image or images on the polymer sheet, such as the FRP sheet, prior to forming the lamination of the structural panel.

Figure 6:
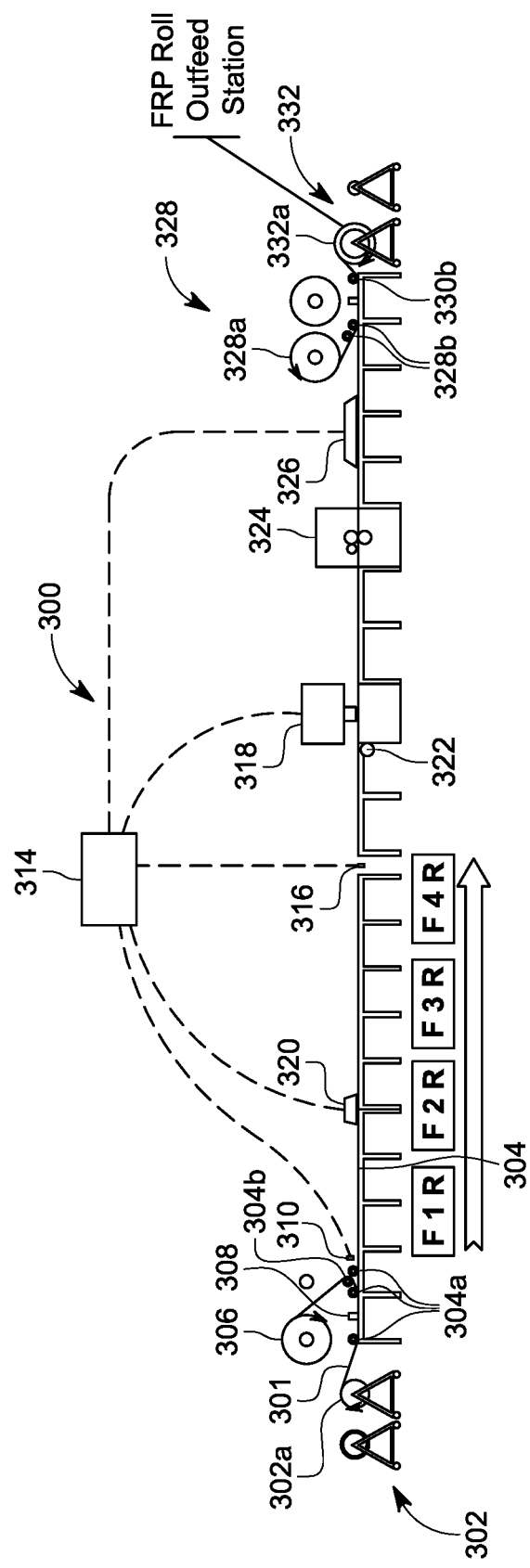
FIG. 6 is a schematic drawing of a roll-to-roll printing process for the roll of FRP for use in an RV panel.
Figure 6A:
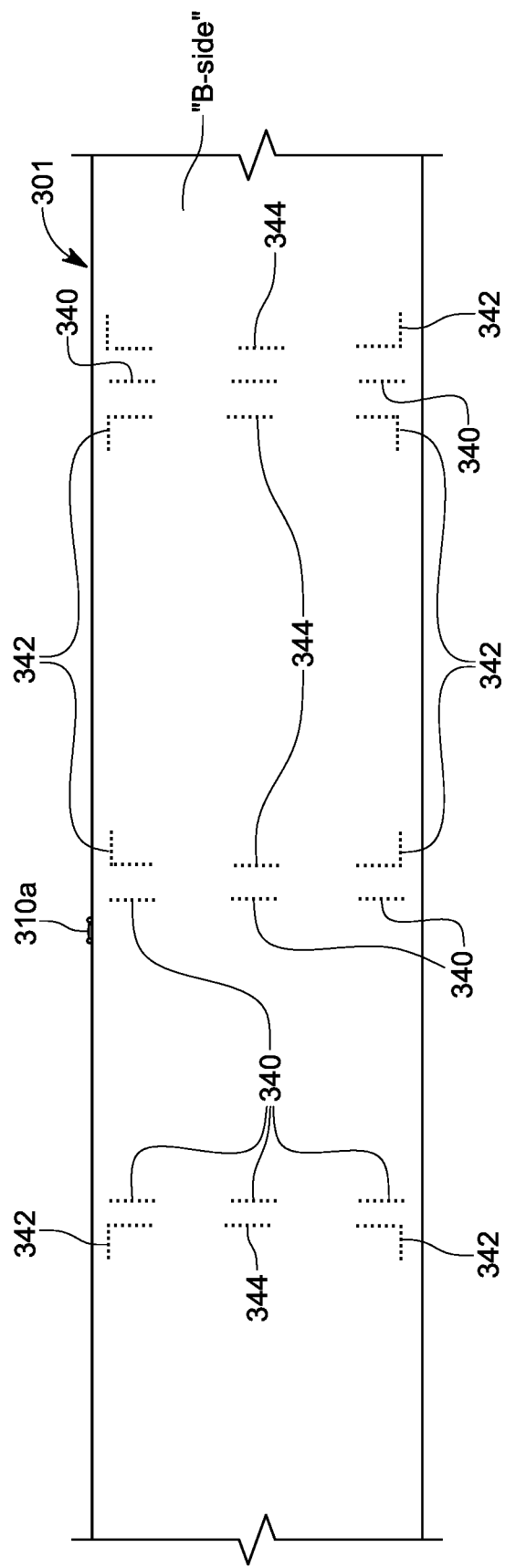
FIG. 6A is a bottom plan view of a section of the FRP roll illustrating the B side of the FRP roll.

Referring to FIGS. 6 and 6A, the numeral 300 generally designates a roll-to-roll printing system for printing the image or images on a roll 301 of FRP. Printing system 300 includes an inlet feed station 302 for the FRP roll 301 in the form of one or more rollers 302*a*, which support the FRP roll 301 and are located adjacent a conveying surface 304 (such a plurality of rollers supported in a frame) on which the FRP roll 301 is unrolled and supported for processing. At the inlet feed end of conveying surface 304, system 300 includes a plurality of rollers 304*a*, spaced above conveying surface 304, which receive the FRP roll 301 from inlet feed station 302 (between rollers 304*a* and the conveying surface 304) and guide the roll 301 across the conveying surface 304.

System 300 also includes an additional roller 304*b* that is used to remove the protective film off the FRP roll 301 and redirect the protective film onto a roller 306, either for later use or disposal. The protective film is normally provided on the FRP roll 301 to protect the FRP roll during handling, but which must be removed for processing, and then optionally reapplied after processing with the same or another protective film, as described below.

System 300 also includes a cutting station 308, for cutting the roll of FRP to its desired length to form sheets of FRP, or to remove a section of the roll that has a defect. When a roll of FRP is supplied by supplier, the supplier will often apply a tag 310*a* (FIG. 6A) on the edge of the roll of FRP to indicate minor defects that have occurred during the manufacturing process. Depending on the application, the defects may be acceptable because the defect may occur at the end of usable length of the roll of FRP. If the defect is at an unacceptable location, the affected section of FRP roll 301 may be cut to remove the defect. Alternately, the roll of FRP may be left intact and instead that section of the roll of FRP may be left unprinted and passed through along with the printed sections of the roll of FRP, using a print skip function noted below.

To detect the location of the defects, system 300 may include a sensor 310, such as an optical sensor, which is configured to generate a signal when detecting a tag 310*a* (FIG. 6A) on the roll 301 of FRP as the roll 301 of FRP is rolled out along conveying surface 304. To control the operation of one or more components of system 300, system 300 may include a microprocessor-based computer 314, which is in communication with sensor 310 and printers 316 and 318, described more fully below.

In addition to sensor 310, system 300 also includes a counter, such as a counter mounted below sensor 310, to measure the length of the roll of FRP as it is moved along the conveying surface 304 so that the images printed on the roll of FRP (described below) can be registered relative to an optical reference (described below), and eventually a structural reference relative to the structural panel(s) formed from the sheet of FRP. A suitable counter may comprise a wheel with an encoder, for example.

The counter may also be used to determine whether defect is in acceptable location along the roll, and, if not, may be used by computer 314 to control the starting and/or stopping of the printers 316 and 318 to skip that section with the defect and resume printing when a suitable section of roll 301 for printing is determined, for example, when an acceptable length of the FRP roll has been rolled out that is free of defects. Thus, the counter may be used by computer 314 together with the sensor 310 to determine whether the roll needs to be cut to remove a defective section from the roll or generate a skip function for the printers when a section of the FRP roll is passed through the system, but to be not processed (i.e., not printed), so that computer 314 knows when to start/stop the printing process.

To remove static and/or dust, system 300 also includes a static neutralizing apparatus 320, such as a de-ionizer air flow apparatus, which may be controlled by computer 314, and which removes static and blows off the dust to prepare the surface for printing.

In the illustrated embodiment, system 300 prints on both sides of the roll of FRP. To that end, as described above, system 300 includes printer 316, which is located beneath the conveying surface and which is positioned to print on the underside or "B-side" of the roll of FRP. Printer 316 is configured to print images in the form of lines or dots or other geometric shapes to form optical references for use in the post printing processing steps describe below.

In contrast, printer 318 is positioned relative to conveying surface 304 to print on the upper side of the roll of FRP, which forms the visible side or "A-side" of the roll of FRP. The term "upper" is simply used as a reference to the orientation of system 300 shown in FIG. 6. Printer 318 is configured to print one or more images on the side of the roll of FRP that will be used to form the visible side of the structural panel, to form, for example decorative images, or installation reference guides, as described above. As noted above, a suitable printer includes a direct printer, such as an inkjet printer, or a dye sublimation printer. Prior to being guided into printer 318, 300 may include a vinyl roll 322 which allows for the printing of roll-to-roll goods (paper, static/adhesive vinyl, etc) onto the roll in the event it is desirable to print decals/stickers for selected messaging or printed image repair activities.

Depending on the type of printing process provided by printer 318, system 300 may also include a clear coat application apparatus 324, such as a UV clear coat roller coater (sprayer or roller), which applies a clear coat to the printed side of the roll of FRP. The clear coat is then cured by passing the roll of FRP through an oven 326, which may also be controlled by computer 314.

After the curing process, system 300 optionally includes a protective film applicator assembly 328, which includes a roller 328a that supports a roll of protective film that is guided onto the surface of the printed roll of FRP via guide rollers 328b, which are mounted above conveying surface 304. Once coated with the protective film, the roll of FRP is guided by an additional roller 330b, which directs the film coated, printed roll of FRP to an outfeed station 332, which includes an outfeed station roller 332a to receive and roll the film coated, printed roll of FRP at the end of conveying surface 304, for later processing.

In the case of dye sublimation printing, the coat application apparatus 324 and oven 326 may be replaced with a thermal press (e.g. double belt thermal press), which traps the dye through heat and pressure in the substrate (e.g. the FRP).

When using a continuous feed of the FRP roll 301, the sequence of the printing onto the roll of FRP may be reversed from the post processing sequence so that when the rolled film coated, printed roll of FRP is unrolled, the sequence of the printed images will coincide with the desired post processing steps. For example, for a given a series of panels P1, P2, P3, and P4 that are to be formed from the rolled film coated, printed roll of FRP, the sections of the rolled FRP that include the images for panels P1, P2, P3, and P4 are printed so that the images for panel P4 are printed first followed by images for panel P3, followed by the images for panel P2 followed by images for panels P1. Similarly, each section of the rolled FRP may be printed from right (R) to left (F). In this manner, when the film coated, printed roll of FRP is unrolled from output the station roller 330a, the sections of the rolled FRP (for the structural panels to be formed) will be rolled out with the roll of FRP cut from left and right, starting with starting with panel P1, followed with panel P2, followed with panel P3, and then followed with panel P4.

Referring to FIG. 6A, as noted above, the underside of the roll of FRP 301 may be printed with images to form optical references 340, 342, and 344. The printing of the images on the "A-side" of the roll of FRP and the "B-side" of the roll are synchronized by computer 314 so that the images on the A-side are in a known location relative to at least optical references 342, 344. For example, the optical references 340 may include lines to indicate where the section of the roll of FRP is be cut to form a sheet of FRP for use in the sidewall lamination process. Optical references 342, 344 include lines or geometric shapes inward of the cut lines, which will be used as optical references for aligning the sheet of FRP onto the frame (such as frame 60 described above) such that when the structural panel is assembled, the optical references 342 and 344 are in fixed registry with a structural reference of the structural panel.

In this manner, when a section of the roll is cut along two adjacent cut lines, the sheet formed by the two cuts can then be aligned on the frame (e.g., frame 60) using optical references 342, 344. Thus, the image(s) on the A-side of the sheet are now in fixed registry, not only with the optical references, but also with the same structural references of the structural panel, i.e., the edges of the structural panel.

Alternately, the role of FRP may be cut into sheets prior to the above process, and then printed, clear coated, cured, and stacked for use in the sidewall lamination process.

In yet another embodiment, the structural panels 16 may be formed prior to the above process line, which are then introduced into the above process line to be printed, clear coated, and stacked for later use in the RV assembly process.

As noted above, any of the structural panels described herein may be formed using a free hung FRP manufacturing process in which the image is formed internally to the structural panel, as described below. Thus, in each case, the printed image may be internal to the structural panel or may be in the outer surface of the structural panel.

Further, while described in reference to the images being referenced to the outer perimeter of the structural panel, other fixed structural references may be used. For example, the image(s) may be referenced to holes or other fixed structural features that are located in a known location. This may be suitable, for example, when forming an internal structural panel, such as the top of a counter or table, which may also be provided with a pattern. Therefore, it should be understood that the term "structural panel" is used broadly to include panels that are used to form walls (both exterior and interior walls), floors, ceilings, tables, or interior components, such as countertops, table tops, cabinets, or the like.

Figure 7:
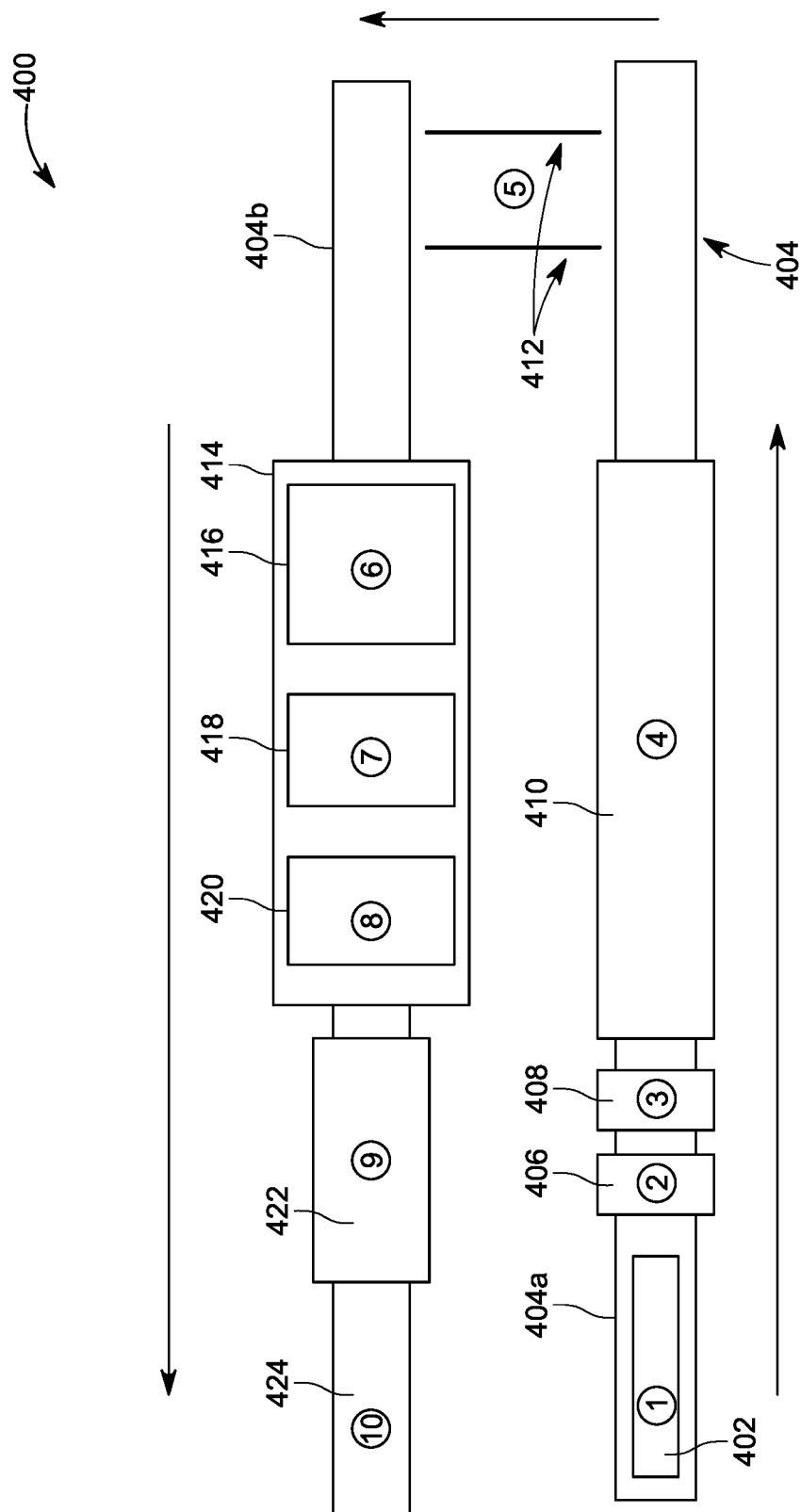
FIG. 7 is a schematic drawing of a "free hung" FRP panel manufacturing system.
Figure 7A:
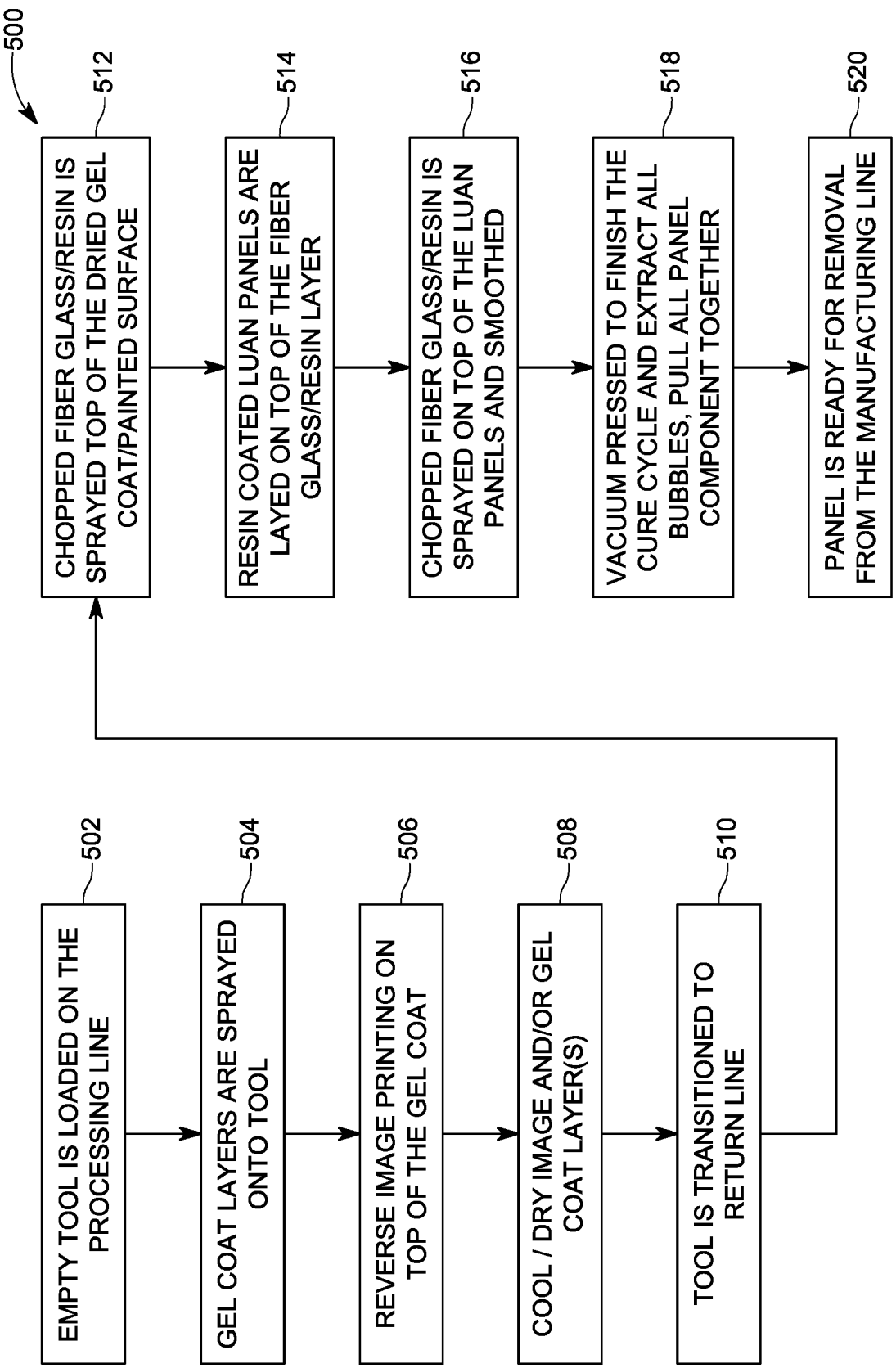
FIG. 7A is a flow chart of the manufacturing process of the system of FIG. 7.

Referring to FIGS. 7 and 7A, the structural panels described herein may be formed in manufacturing system 400 using the method 500. In manufacturing system 400, an empty tool 402, such as a large hard, optionally polished surface, for example, a plate or platen made from a hard epoxy resin or metal, is loaded into the input side 404*a* of a processing line 404 (502). The tool may be coated with a release material to facilitate release of the panel after it is formed. As the tool 402 is moved along processing line 404, it is moved through a sprayer 406, for example on rollers, where one or more gel coat layers are sprayed (504) onto tool 402 to create an outer clear surface for the structural panel. After the tool is sprayed with the gel coat layer or layers, tool 402 is moved along processing line 404 into a printer 408 (such as a direct ink printer, including an inkjet printer, or a dye sublimation printer), where a reverse image is printed onto the upwardly facing surface of the gel coat layer (506). In this manner, when the final panel is produced, the image that is viewable through the A-side of the panel will have the correct orientation.

After the printing step (506), the tool 402 is passed through a cooling/drying chamber 410 (508) to cool or dry the images and/or gel coat layers (508).

After drying, the tool is then transferred over, for example, by transfer rollers 412, to a return line 404*b* (510) of processing line 404 where tool 402 is then conveyed into a chamber 414, where a sprayer 416 sprays chopped fiber glass/resin on top of the dried gel coat/printed surface (512). Thereafter, wood layers, such as resin coated lauan panels, which are held in a stacker 418 are layered on top of the chopped fiber glass/resin layer (514), followed by a second sprayer 420 that sprays another layer of chopped fiber glass/resin onto the lauan panels (516). Optionally, the layers are smoothed, using a tool.

Then after the final layer of layer chopped fiber glass/resin is applied, the layers are conveyed into a vacuum chamber 422, such as vacuum bag, where the vacuum presses (518) on the layers to finish the cure cycle and extract bubbles, and thereby pull all layers of panel together. Then, the panel is ready for removal from the manufacturing line (520) at the output end 424 for use in the RV assembly line.

As described above, the various structural panels disclosed herein may have one or more images printed therein, which may be used to facilitate installation and/or repair. Further, as will be more fully described below, when the images comprise readable data, the images may also be used as part of a manufacturing workflow process, a dealer workflow process, an end user workflow process, and/or a warranty and service workflow process, which may be implemented using a software database, stored on the manufacturer's server, but accessible through a handheld device, described below.

Figure 8:
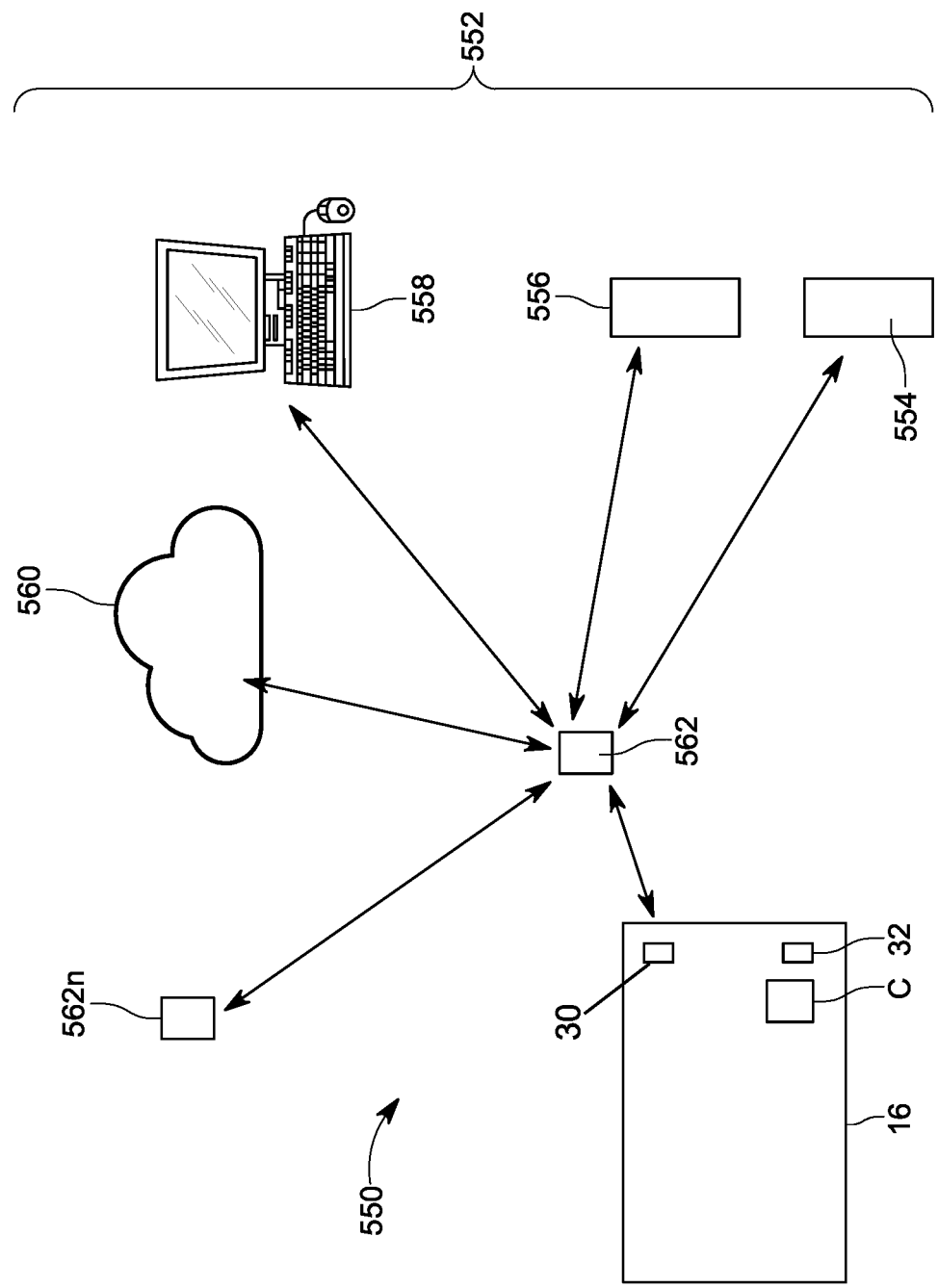
FIG. 8 is a schematic drawing of a workflow system.

Referring to FIG. 8, the numeral 550 generally designates a workflow system 550 that may use the various data on the recreational vehicle described above, including the data printed on the structural panels 16. System 550 includes a database, which may be stored in a storage location 552 (such as a server, for example, an RV manufacturer's server 554 or a dealer's server 556), a computer 558, for example, accessible by a manufacturer or dealer, or cloud storage 560. In addition, system 550 may include one or more handheld electronic devices 562 . . . 562*n*, which are configured to scan the barcodes printed in (or as noted below tags affixed to) the RV and communicate wirelessly with one or more of the storage locations, for example, through a network.

For example, a suitable handheld device includes a central processing unit, such as microprocessor, a camera, a scanning application stored in the central processing unit to allow the camera to scan the above described barcodes and/or tags (noted below), and other software to enable one or more of the features described herein. Alternately, or in addition, the handheld device may include a laser, with the scanning application configured to scan barcodes using the laser. In addition, the handheld device may include a wireless communication device for communicating with one or more the storage locations noted above, such as the RV manufacturer's server, for uploading data scanned by the handheld device to the manufacturer's database. Optionally, the handheld device may also communicate with other servers, including a component manufacturer's server to download information relative to components installed in the RV unit, and a phone exchange server to allow email communication, as well as a cell tower to provide cellular phone service. For example, a suitable handheld device includes a smartphone.

In one aspect, the handheld device includes an application that allows the handheld device to communication with one or more of the database and/or storage locations. For example, when the application is configured for an installer, the storage location may send information about the component to be installed and/or installation instructions for a component. When configured for a dealer, once the handheld device is used to scan one or more of the RV barcodes (or tag described below), the storage location may communicate with the handheld device to provide a menu of options, including a link to a brochure, a video, or a manual for the RV and/or the components associated with the RV unit. A similar link may be provided for an owner (user's) application. Further, in response to scanning the barcode, the application will forward the information, e.g., the vehicle identification and installed component information, to one or more of the stored locations for use, as described below.

Figure 8A:
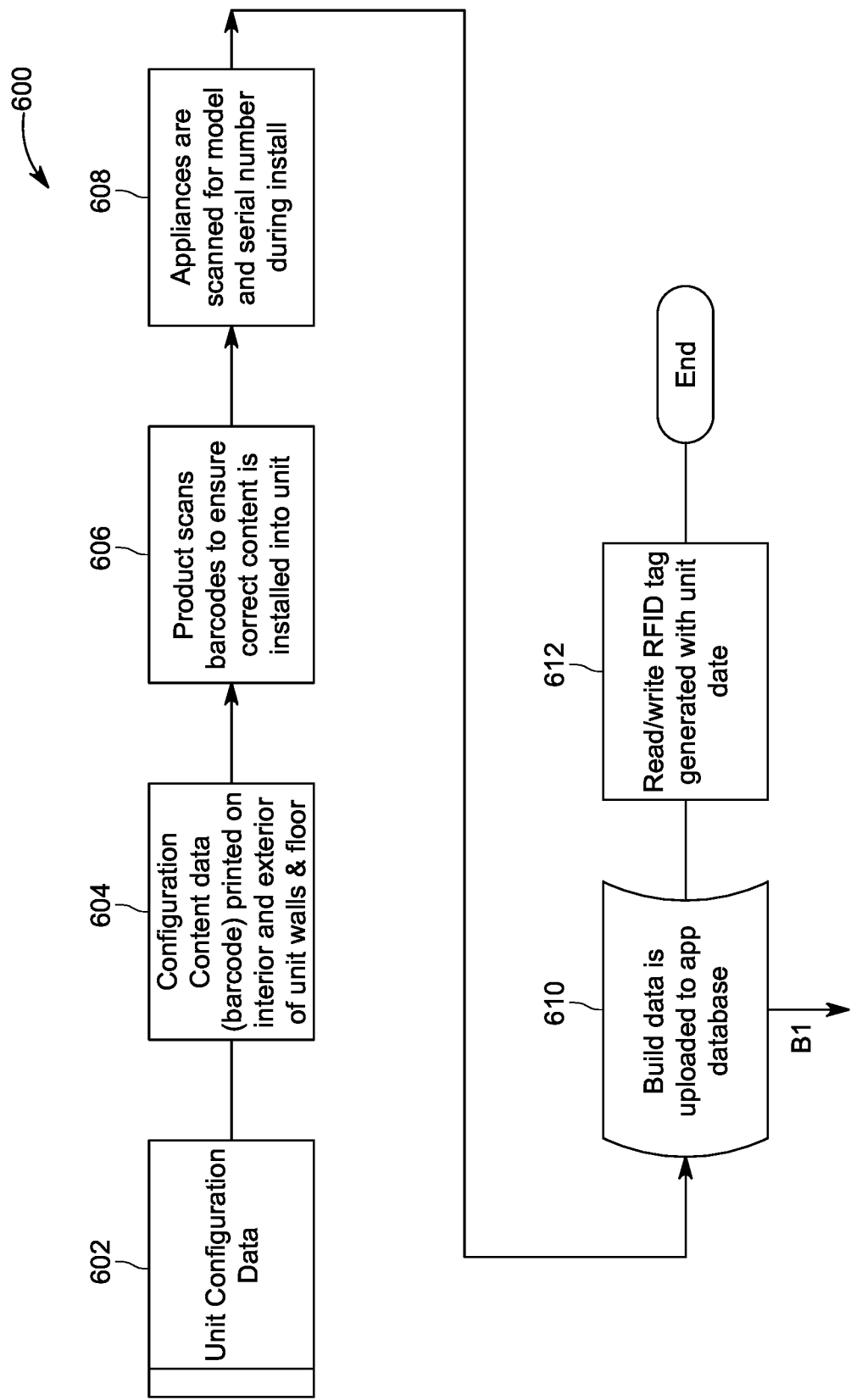
FIG. 8A is a flowchart illustrating a manufacturing workflow for using data applied to an RV component of a recreational vehicle.

Referring to FIG. 8A, a manufacturing workflow process 600 may use one or more images on the structural panels described herein (e.g. floor 22, sidewalls 18, 118) during the manufacturing process. For example, the RV unit's configuration data (602) (which may include (1) image file data for the images printed on the sidewalls, which are viewable from the interior or exterior of the RV, (2) location information for the images printed on the side walls, and (3) the components to be installed in the RV, and other relevant data to the RV (such as the RV VIN number) may be input into the application database.

As understood from the above, information about one or more components to be installed in the RV, referred to collectively as "the configuration data," may be printed in the form of one or more barcodes on the interior and/or exterior of any of the structural panels, for example on the interior and/or exterior of the walls or the floor (604). As described above, each barcode may be provided at a location near or adjacent the installation location of a component and, further, be visible after the component is installed to that it can be scanned, during or after the RV assembly process.

These barcodes may be scanned using the handheld device, noted above, during the installation process to provide instructions. For example, when scanned, the instructions may be displayed on the handheld device and provide instructions to an installer which components are to be installed at the RV and where.

As noted above, a suitable handheld device includes a central processing unit, such as microprocessor, a camera (and optionally a laser), a scanning application stored in the central processing unit to allow the camera (or laser) to scan barcodes, and other software to enable one or more of the features described herein.

Scanning of the barcodes may also be used to ensure that the correct components have been installed. For example, once the RV has components installed, an installer or other worker can scan the barcode that is adjacent or near the component and then scan the barcode of the component(s) (which are tagged with their own barcode, either by the manufacturer or when received at the RV manufacturing facility). The installer or other worker may then compare the information relative to the installed component to the to-be-installed component information to ensure that the proper component has been installed (606). Once it has been confirmed that the correct component has been installed, the information of the installed component, for example, the model and serial number, which may be obtained by scanning the manufacturer's barcode (608), may be uploaded to the RV manufacturer's application database (610) to create "build data" for the RV.

Optionally, a read/write chip, such as a read/write RFID tag, may then be generated with the "build data" or unit configuration data (612) and then applied to the RV for later use by a dealer, an end-user, or a service provider, e.g. for service and/or warranty work.

Any of these barcodes or tag may be scanned using a handheld device after the installation process to provide an installation history or service history for the RV unit and other information.

Figure 8B:
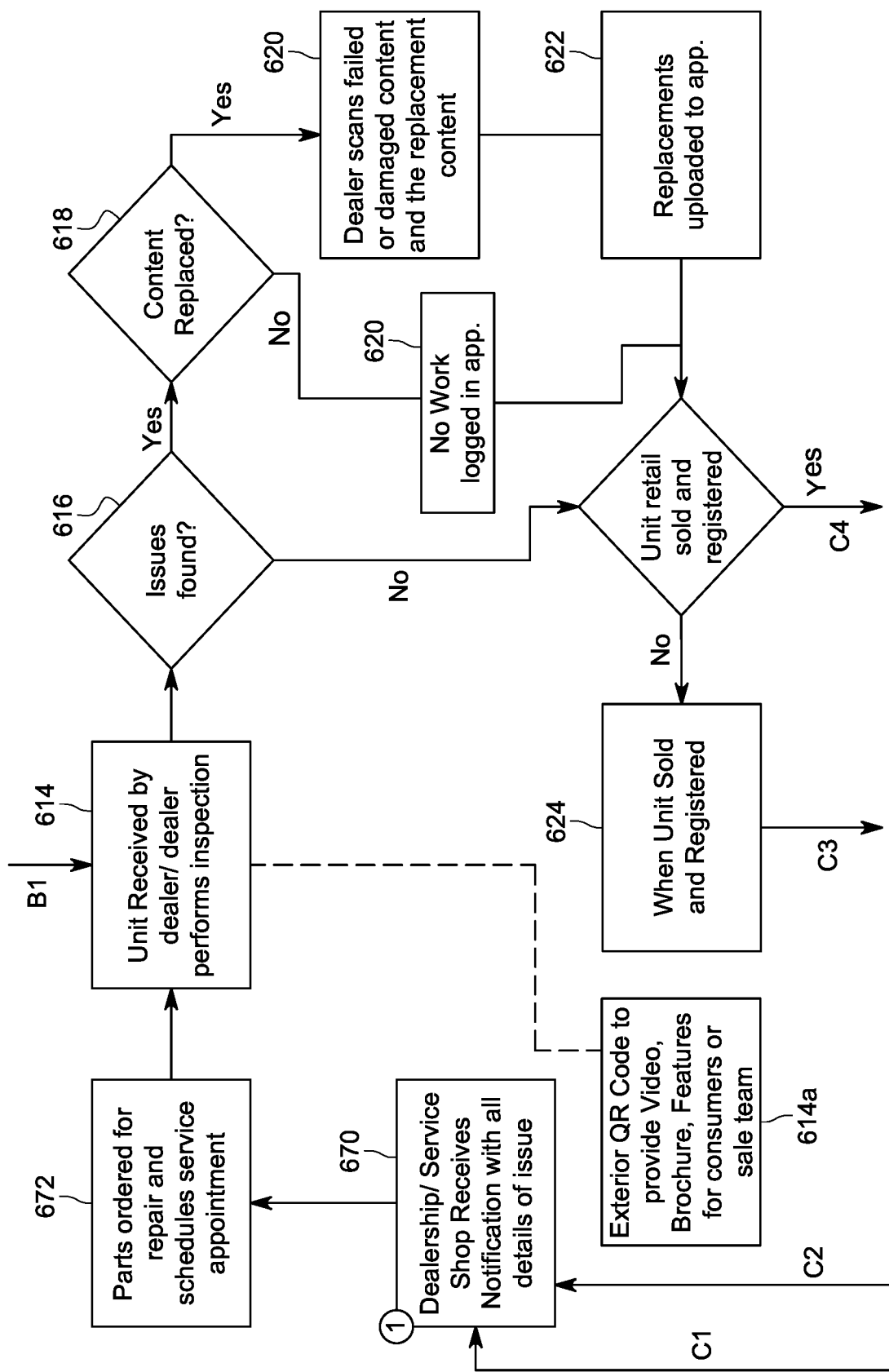
FIG. 8B is a flowchart illustrating a dealer workflow for using data applied to an RV component of a recreational vehicle.

Referring to FIG. 8B, once an RV unit is received by a dealer, a dealer typically inspects the RV unit and components of the RV unit for defects and/or damage (614). If the dealer determines at 616 that a defect or damage is found, then the dealer determines at 618 whether the component needs to be replaced. If replacement is required, the dealer scans the defective or damaged component (e.g. with a handheld device), and further scans the replacement component, which information is uploaded to the application database (622).

If the dealer determines at 618 that no replacement is required, the dealer will then document the findings and any repair work that is done in the application database (620). Once there is a solution, namely either the component is replaced or repaired, the RV unit is then ready to be sold.

Optionally, the dealer may scan the barcodes (or tag) on the RV to download videos, brochures, and other informational material to describe and/or illustrate features for the sales team or for a customer (614*a*).

Once the unit is sold and registered (624), then the end-user or owner can download an application to a handheld device (626), such as a smartphone, which provides the end-user access to information relative to their RV unit. For example, the application may allow an end user to request information about how to use the RV unit or service the RV unit (628). In response, the software application directs the user to scan the barcode or barcodes of the RV unit. Once the barcode or barcodes are scanned (630), the application will load information about the RV unit, including videos, such how-to instructions/videos, maintenance or operation manuals to provide routine maintenance information and/or routine maintenance checklists (634).

If additional support is required, the application may be configured to contact or allow the user to contact a dealer or other OEM support for assistance (636). Once the application or the user contacts the dealer or other OEM support, the application will to allow an online technician to talk with the end user, via for example video chat or via the phone function of the handheld device (638). If the issue requires service at 640, a service work order will be created (642). Once a service work order is created, a bulletin or recall notice may be created so that a notification can be sent to affected units (644).

If the issue does not require service at 640, then no further action is required 646.

Figure 8C:
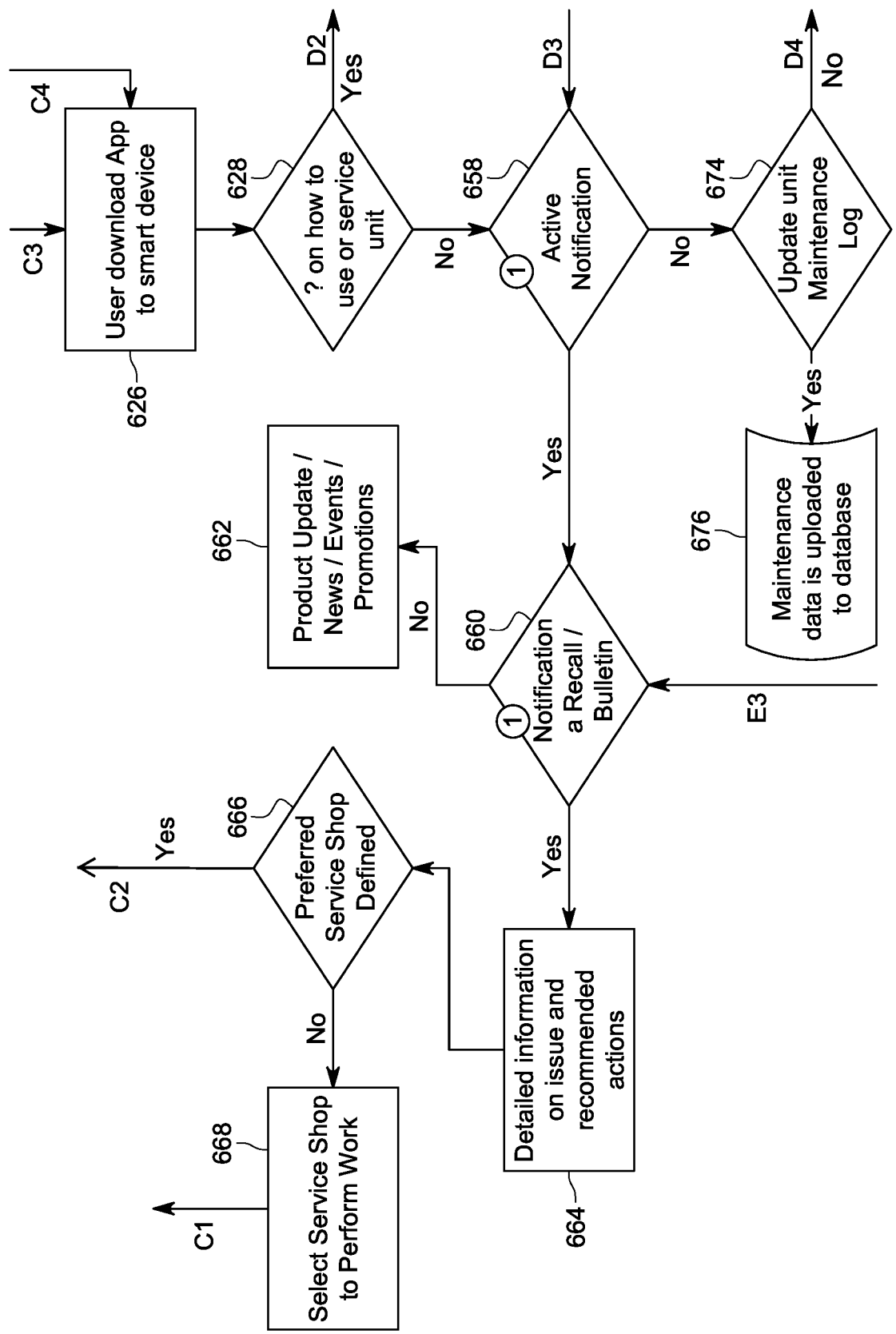
FIG. 8C is a flowchart illustrating an end-user workflow using the data applied to the RV component of a recreational vehicle.
Figure 8D:
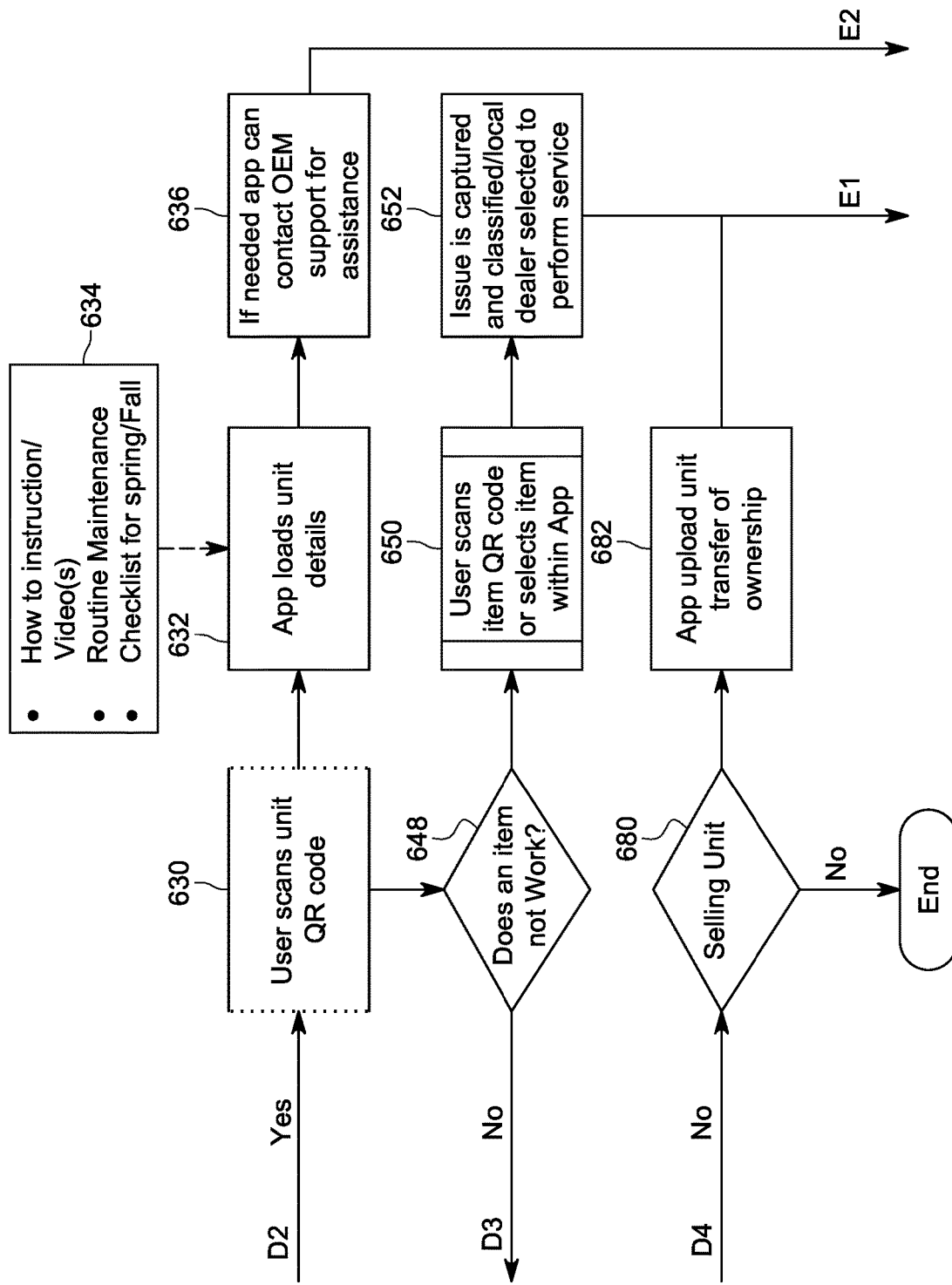
FIG. 8D is a continuation of the flowchart of FIG. 8C illustrating an end-user workflow using the data applied to an RV component of a recreational vehicle.
Figure 8E:
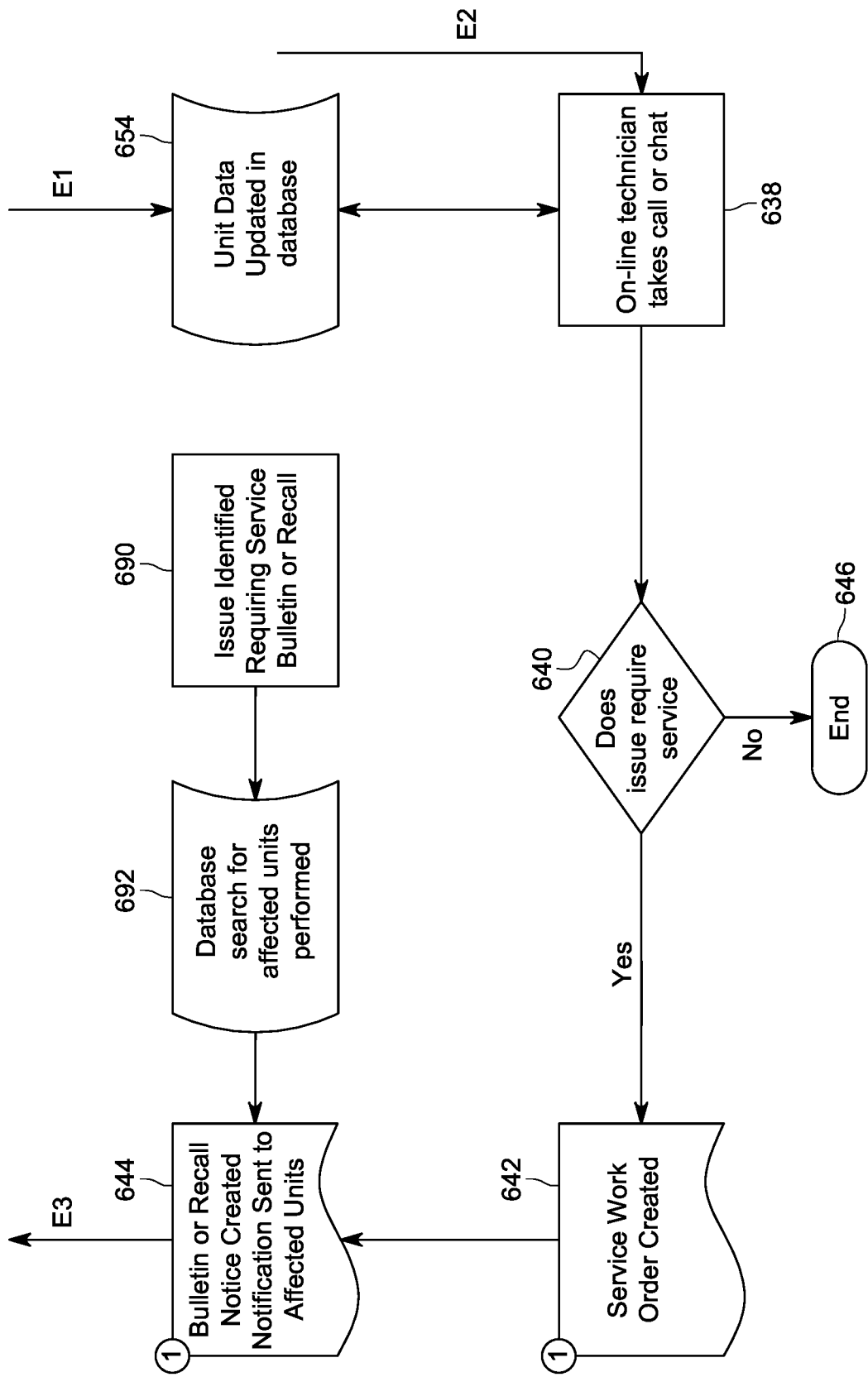
FIG. 8E is a flowchart of a warranty/service workflow using the data applied to an RV component of a recreational vehicle.

Referring to FIG. 8D, if the end-user is inquiring how to use or service an RV unit or component because item does not work at 648, the application may direct a user to scan the component barcode and/or select an item within the application (650). Once the barcode for the relevant component is scanned or the item within the application is selected, then the issue is captured and classified and a local dealer is selected to perform the required service (652). In addition, the RV unit data is uploaded into the database for the selected dealer so that the dealer has access to the information required to perform any necessary maintenance, repair, or service (654) (FIG. 8E).

Referring again to FIG. 8C, the downloaded application may also provide automatic notifications (658), for example when a recall notice or bulletin is issued (660) for the RV unit or component mounted within the RV unit, or when there are product updates, news, or events, for example for promotions (662).

When a recall notice or bulletin is issued, the notification on the application will provide detailed information on the issue and provide recommended actions (664). Further, the notification may specify a preferred dealer or service shop (666) or allow the end user to select a dealer or service shop to perform the work (668).

Once a preferred service shop is specified (666) or selected (668), the dealer or service shop will receive notification with all the details of the issue (670) from the application. When needed, the dealership or service provider will be able to order the parts for repair and then schedule the service appointment (672).

Referring again to FIG. 8C, the downloaded application may be configured to allow the end-user to update the maintenance log (672) for the RV unit, which can then be uploaded to the RV manufacturers application database (676). In this manner, an end-user wishing to sell their RV unit (680) may use the application to upload the transfer of ownership of the RV unit (682) (see FIG. 8D), which can then be used to update the RV unit's data in the dealer's database (654).

Referring to FIG. 8E, at any time an issue is identified, for example by a dealership, an individual owning similar RV, a repair shop, or manufacturer, which requires a service bulletin or recall (690), the application will search the relevant databases for affected units (692) so that the notification may be generated and sent to the end-user users of the affected RV units (644).

In order to protect information in the database, access may be limited. For example, access for an owner or user may be limited using a user's password and only allow access to certain portions of the database. And when the RV is sold, the database will need to be updated with the new owner's name to allow the new owner to set their new password so they can access the owner's portion of the database and terminate the old owner's access. Similarly, a dealer or supplier may have a password that will only let the dealer or supplier have access to a portion of the database for dealers or suppliers. In this manner, a single database may be used by the manufacturer, supplier, dealer, and owner.

The above description is that of current embodiments. Various alterations and changes can be made without departing from the spirit and broader aspects as defined in the appended claims, which are to be interpreted in accordance with the principles of patent law including the doctrine of equivalents. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described herein may be combined with other elements or replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

We claim:

1. A method of forming a structural panel for a recreational vehicle, the structural panel forming a sidewall, an interior wall, a floor, or a ceiling of the recreational vehicle and having an outer side and an inner side, said method comprising the steps of:
   providing a plurality of layers, one layer of the plurality of layers comprising a printable layer formed from an ink printable material;
   forming a lamination from the plurality of layers to form the structural panel, said forming including forming an outer surface of the outer side of the structural panel with the printable layer, and said forming further includes forming the lamination into the sidewall, interior wall, floor, or ceiling of the recreational vehicle;
   reinforcing the lamination with a reinforcing component;
   forming an optical reference in a known fixed location relative to the structural panel;
   printing a two-dimensional image on the printable layer, the image being formed from a plurality of pixels, said printing including printing the image at a known location in fixed registry with the optical reference wherein each pixel forming the image is in a precise known location on the structural panel; and
   providing the reinforcement component in a known location in fixed registry with the optical reference wherein each pixel forming the image is in a precise known location in fixed registry with the reinforcement component; and
   wherein the printable layer has a first side and a second side, said forming an optical reference comprises printing an image on the second side of the printable layer, and said printing further comprises printing the image on the first side of the printable layer at a known location in fixed registry with the optical reference on the second side of the printable layer.

2. The method according to claim 1, wherein said printing is prior to said reinforcing of the lamination.

3. The method according to claim 1, wherein said printing is after said reinforcing of the lamination.

4. The method according to claim 1, wherein said printing a two-dimensional image includes printing the two-dimensional image across the entire side of the printable layer.

5. The method according to claim 1, further comprising coating the printable layer with a protective coating.

6. The method according to claim 1, wherein said reinforcing includes reinforcing the lamination with a frame.

7. The method according to claim 1, wherein said locating the two-dimensional image at a known location in fixed registry with the optical reference includes storing a location of the optical reference and referencing the stored location to an image file for the two-dimensional image.

8. The method according to claim 1, wherein said printing a two-dimensional image comprises printing a reference guide.

9. The method according to claim 1, wherein said printing a two-dimensional image comprises printing a decorative image.

10. The method according to claim 1, wherein said printing a two-dimensional image comprises printing a readable image.

11. A structural panel for a recreational vehicle, said structural panel forming a sidewall, an interior wall, a floor, or a ceiling of the recreational vehicle and having an outer side and an inner side, the recreational vehicle having a chassis and a plurality of wheels, at least a portion of said outer side of said structural panel being visible when mounted relative to the chassis of the recreational vehicle, and said structural panel being formed by the method of claim 1.

12. The structural panel according to claim 11, wherein said plurality of layers includes a layer of wood and a layer of fiber reinforced plastic (FRP), and said image printed on or in said layer of FRP.

* * * * *